United States Patent
Dash et al.

(10) Patent No.: US 10,675,598 B2
(45) Date of Patent: Jun. 9, 2020

(54) HIGH SHEAR THIN FILM MACHINE FOR DISPERSION AND SIMULTANEOUS ORIENTATION-DISTRIBUTION OF NANOPARTICLES WITHIN POLYMER MATRIX

(71) Applicant: South Dakota Board of Regents, Pierre, SD (US)

(72) Inventors: Ilchgerel Dash, Rapid City, SD (US); Robb M. Winter, Rapid City, SD (US)

(73) Assignee: SOUTH DAKOTA BOARD OF REGENTS, Pierre, SD (US)

( * ) Notice: Subject to any disclaimer, the term of this patent is extended or adjusted under 35 U.S.C. 154(b) by 78 days.

(21) Appl. No.: 15/561,503

(22) PCT Filed: Mar. 23, 2016

(86) PCT No.: PCT/US2016/023820
§ 371 (c)(1),
(2) Date: Sep. 25, 2017

(87) PCT Pub. No.: WO2016/154342
PCT Pub. Date: Sep. 29, 2016

(65) Prior Publication Data
US 2018/0056253 A1 Mar. 1, 2018

Related U.S. Application Data

(60) Provisional application No. 62/251,587, filed on Nov. 5, 2015, provisional application No. 62/137,290, filed on Mar. 24, 2015.

(51) Int. Cl.
*B01F 7/00* (2006.01)
*B01F 15/06* (2006.01)
(Continued)

(52) U.S. Cl.
CPC ............ *B01F 7/00816* (2013.01); *B01F 3/14* (2013.01); *B01F 15/065* (2013.01); *B82Y 40/00* (2013.01);
(Continued)

(58) Field of Classification Search
CPC .............. B01F 15/065; B01F 2015/061; B01F 2215/0049; B01F 3/14; B01F 7/00816;
(Continued)

(56) References Cited

U.S. PATENT DOCUMENTS 2,184,348 A   12/1939  Kirchner et al.
2,577,247 A * 12/1951  Irwin ....................... A01J 11/16
                                              426/247
(Continued)

OTHER PUBLICATIONS

Bruce F. Blumentritt, Anisotropy and Dimensional Stability of Biaxially Oriented Poly(ethylene Terephthalate) Films, 13 pages, Journal of Applied Polymer Science, vol. 23,3205-3217 (1979) , 0 1979 John Wiley & Sons, Inc. 0021-8995/79/0023-3205 (Year: 1979).*

(Continued)

*Primary Examiner* — Tony G Soohoo
(74) *Attorney, Agent, or Firm* — Goodhue, Coleman & Owens, P.C.

(57) ABSTRACT

An improved a device and method for dispersion and simultaneous orientation of nanoparticles within a matrix is provided. A mixer having a shaft and a stator is provided. The shaft may have a rupture region and erosion region. Further, an orienter having an angled stationary plate and a moving plate are provided. The nanoparticles and the matrix are fed into the mixer. A rotational force is applied to the shaft to produce shearing forces. The shearing forces disperse and exfoliate the nanoparticles within the matrix. The dispersed mixture is outputted onto the moving plate. The moving plate is forced across the angled stationary plate to
(Continued)

produce fully developed laminar shear flow. The fully developed laminar shear flow or the two-dimensional extensional drag flow orients the dispersed nanoparticles-matrix mixture.

7 Claims, 17 Drawing Sheets

(51) Int. Cl.
  *B82Y 40/00* (2011.01)
  *B01F 3/14* (2006.01)
  *C08J 3/20* (2006.01)
  *C08J 5/00* (2006.01)
(52) U.S. Cl.
  CPC .............. *C08J 3/203* (2013.01); *C08J 5/005* (2013.01); *B01F 2015/061* (2013.01); *B01F 2215/0049* (2013.01); *C08J 2300/00* (2013.01)
(58) Field of Classification Search
  CPC ....... B82Y 40/00; C08J 2300/00; C08J 3/203; C08J 5/005
  See application file for complete search history.

(56) References Cited

U.S. PATENT DOCUMENTS

| | | | | |
|---|---|---|---|---|
| 2,693,348 A | * | 11/1954 | Ellermann | B29C 48/03 366/85 |
| 3,105,322 A | * | 10/1963 | Katz | B32B 27/00 264/131 |
| 3,121,915 A | * | 2/1964 | Heller, Jr. | B29C 48/08 264/556 |
| 3,189,505 A | * | 6/1965 | Jensen | B29B 13/023 156/199 |
| 3,389,199 A | * | 6/1968 | Bushnell, Jr. | B29C 44/0461 264/45.6 |
| 3,518,721 A | * | 7/1970 | Stanislavovic | F16B 33/02 425/202 |
| 3,572,646 A | * | 3/1971 | Kocher | B22D 11/10 366/89 |
| 3,664,790 A | * | 5/1972 | Hollander | B29C 48/19 425/131.1 |
| 3,689,184 A | * | 9/1972 | Morse | B29C 45/50 100/148 |
| 3,746,315 A | * | 7/1973 | Rizzi | B29B 7/426 366/294 |
| 3,841,814 A | * | 10/1974 | Eckhardt | B29C 45/464 425/208 |
| 3,876,188 A | * | 4/1975 | Koch | B29B 7/401 366/78 |
| 3,932,573 A | * | 1/1976 | Kucsma | B29B 9/04 264/118 |
| 3,981,658 A | * | 9/1976 | Briggs | B29C 48/92 425/205 |
| 4,022,440 A | * | 5/1977 | Kawamura | B29B 7/38 366/76.7 |
| 4,125,582 A | * | 11/1978 | Langlois | B29C 45/1634 264/73 |
| 4,198,383 A | * | 4/1980 | Konsetov | B01J 19/18 366/279 |
| 4,299,792 A | * | 11/1981 | Nunn | B29C 45/60 264/328.18 |
| 4,304,539 A | * | 12/1981 | Hagiwara | B29C 43/24 425/145 |
| 4,306,848 A | * | 12/1981 | Nunn | B29C 45/0005 264/73 |
| 4,347,202 A | | 8/1982 | Henckel et al. | |
| 4,734,196 A | * | 3/1988 | Kono | B01D 67/0009 210/500.36 |
| 4,744,521 A | * | 5/1988 | Singer | B01F 7/008 241/244 |
| 5,108,711 A | * | 4/1992 | Chszaniecki | B01F 7/30 422/135 |
| 5,164,123 A | * | 11/1992 | Goudy, Jr. | G21F 9/008 264/0.5 |
| 5,335,992 A | * | 8/1994 | Holl | B01F 5/0646 366/348 |
| 5,370,824 A | * | 12/1994 | Nagano | B01F 7/008 264/4.7 |
| 5,538,191 A | * | 7/1996 | Holl | B01F 3/1221 241/1 |
| 5,674,004 A | * | 10/1997 | Takeuchi | B29C 48/36 366/69 |
| 5,736,086 A | * | 4/1998 | Jones | B32B 15/08 264/171.17 |
| 6,139,415 A | | 10/2000 | Rosow et al. | |
| 6,787,246 B2 | * | 9/2004 | Holl | B29C 43/02 428/548 |
| 6,969,484 B2 | * | 11/2005 | Horiguchi | B01D 39/1623 264/101 |
| 7,377,684 B2 | * | 5/2008 | Zumbrunnen | B01F 5/061 366/297 |
| 7,513,677 B2 | * | 4/2009 | Gneuss | B29C 48/767 366/83 |
| 7,662,321 B2 | * | 2/2010 | Guo | B29B 11/14 252/378 R |
| 7,692,116 B1 | * | 4/2010 | Holloway | B82Y 30/00 219/121.6 |
| 7,814,965 B1 | | 10/2010 | Spokoiny et al. | |
| 8,003,031 B2 | * | 8/2011 | Lohia | B29C 48/919 264/146 |
| 8,317,983 B1 | * | 11/2012 | Holloway | B82Y 30/00 204/157.41 |
| 8,721,318 B2 | * | 5/2014 | King | B29C 59/04 425/363 |
| 8,926,165 B2 | * | 1/2015 | Ohtsuka | A01J 11/10 366/130 |
| 9,044,881 B2 | * | 6/2015 | Shim | B29C 48/2886 |
| 9,102,091 B2 | * | 8/2015 | Alsewailem | B01F 7/241 |
| 2003/0066624 A1 | * | 4/2003 | Holl | F28D 7/106 165/47 |
| 2006/0005634 A1 | | 1/2006 | Schroeder et al. | |
| 2006/0066012 A1 | * | 3/2006 | Yang | C08J 5/005 264/349 |
| 2006/0131440 A1 | | 6/2006 | Yen | |
| 2008/0152896 A1 | * | 6/2008 | Moorlag | G03G 15/2057 428/323 |
| 2009/0023851 A1 | * | 1/2009 | Bierdel | B29B 9/06 524/495 |
| 2009/0105721 A1 | | 4/2009 | Larkin | |
| 2009/0149594 A1 | * | 6/2009 | Noguchi | B82Y 30/00 524/495 |
| 2009/0179358 A1 | * | 7/2009 | Otoshi | B29C 48/08 264/449 |
| 2009/0226711 A1 | * | 9/2009 | Silvi | B29C 70/58 428/331 |
| 2009/0234045 A1 | * | 9/2009 | Imai | B29B 7/823 523/303 |
| 2010/0090364 A1 | * | 4/2010 | Hashimoto | B32B 23/00 264/175 |
| 2011/0076474 A1 | * | 3/2011 | Mapkar | B82Y 30/00 428/213 |
| 2011/0204296 A1 | * | 8/2011 | Conzen | B82Y 30/00 252/502 |
| 2012/0184666 A1 | * | 7/2012 | Gusain | C08J 5/18 524/528 |
| 2013/0199339 A1 | | 8/2013 | Li et al. | |
| 2014/0080951 A1 | * | 3/2014 | Raman | B29C 48/297 524/264 |
| 2016/0083872 A1 | * | 3/2016 | Zhang | B82Y 10/00 264/164 |
| 2016/0126554 A1 | * | 5/2016 | Beneventi | H01M 4/0402 29/623.5 |
| 2016/0128941 A1 | * | 5/2016 | Park | A61K 9/1682 264/8 |
| 2016/0136681 A1 | * | 5/2016 | Mai | B05C 9/02 427/355 |

(56) References Cited

U.S. PATENT DOCUMENTS

| | | | | |
|---|---|---|---|---|
| 2016/0136682 A1* | 5/2016 | Mai | .......... | B05C 19/04 |
| | | | | 216/51 |
| 2016/0136992 A1* | 5/2016 | Mai | .......... | B42D 25/36 |
| | | | | 428/206 |
| 2017/0341939 A1* | 11/2017 | Kim | .......... | C01B 32/194 |
| 2017/0348652 A1* | 12/2017 | Ishigaki | .......... | H01M 4/0411 |
| 2018/0021748 A1* | 1/2018 | Matsutani | .......... | B01J 13/04 |
| | | | | 264/4.1 |
| 2018/0056253 A1* | 3/2018 | Dash | .......... | B82Y 40/00 |

OTHER PUBLICATIONS

H.-Y. Nie *, M.J. Walzak, N.S. McIntyre, Scratch resistance anisotropy in biaxially oriented polypropylene and poly(ethylene terephthalate) films, 17 pages, H.-Y. Nie et al. / Applied Surface Science 253 (2006) 2320-2326, 0169-4332, copyright 2006 Elsevier B.V. (Year: 2006).*

* cited by examiner

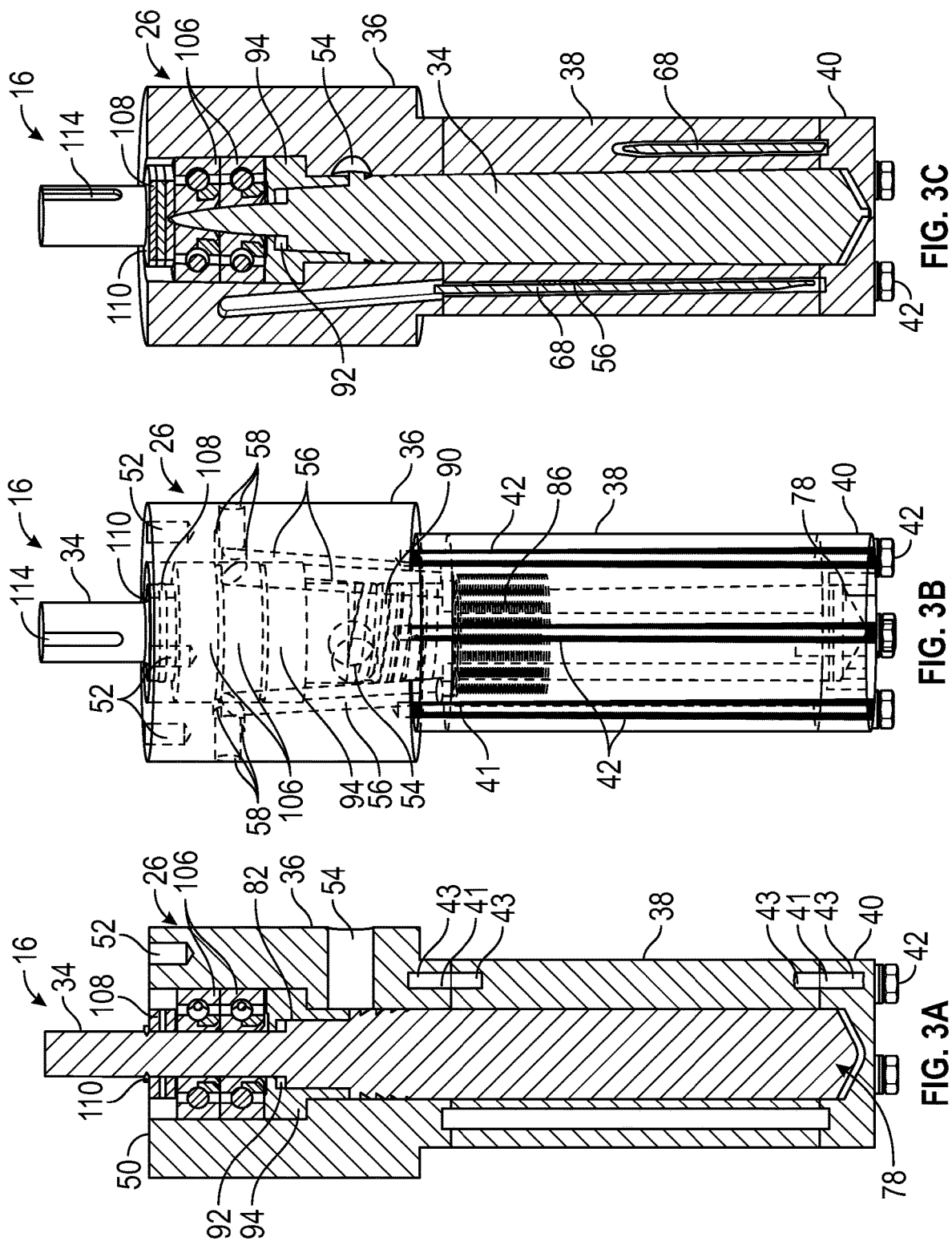

HIGH SHEAR THIN FILM MACHINE FOR DISPERSION AND SIMULTANEOUS ORIENTATION-DISTRIBUTION OF NANOPARTICLES WITHIN POLYMER MATRIX

FIELD OF THE DISCLOSURE

The present disclosure relates generally to improved nanocomposites. More particularly, but not exclusively, the disclosure relates to the simultaneous dispersion and orientation of nanoparticles within a polymer matrix during fabrication of polymer nanocomposites.

BACKGROUND OF THE DISCLOSURE

The use of composite materials is commonplace in today's manufacturing industry. Composite materials advantageously display certain desired physical and/or chemical properties different from the constituent materials. Recent advances in materials science have included development of polymer nanocomposites (PNCs). In the broadest sense, PNCs are comprised of a polymer matrix reinforced with nanoparticles having dimensions less than one hundred nanometers, but often in the range of one to fifty nanometers.

PNCs differ from conventional composite materials due to, among other features, a high surface area to volume ratio between the polymer and the nanoparticles. For example, the total surface area in a unit volume increases 1,000,000 times when the particle size is decreased from one millimeter to one nanometer. As a result, a relatively small amount of nanoscale reinforcement can have an observable effect on the macroscale properties of the composite. In other words, the nanocomposite (NC) properties are drastically increased at low concentrations of nanoparticles (NPs), generally 0.5-5.0 percentage by weight (wt %). For example, Young's modulus and yield strength are doubled at 1 wt % NPs in carbon nanotube/epoxy NCs compared to neat epoxy. One of the most important properties affecting NCs characteristics is maximal interfacial stress transfer between the polymer matrix and the NP surface. This characteristic is strongly dependent on the degree of dispersion and orientation of the NPs in the polymer matrix.

Incorporation of high aspect ratio nanoparticles (HARNPs), or nanoparticles with an aspect ratio greater than 100, into a polymer matrix can significantly increase mechanical properties such as elastic modulus and tensile strength. Additional enhanced properties may include gas permeability, fire retardancy, transparency, and electrical and thermal conductivity, magnetism, shape recovery, wear resistance, corrosion resistance, permeation resistance, self-healing, anti-lighting, conductance, photoluminescence and electroluminescence. For example, carbon nanotubes (CNTs) improve the electrical and thermal conductivity of the composite. Due to such extraordinary and desirable improvement in the properties of such composites, PNCs are used in demanding applications such as aerospace, automotive, electronics, computer technologies, and the like.

When properly dispersed, HARNPs (e.g., nanometer-thin platelets, such as clays to and graphene sheets, or nanometer-diameter cylinders, such as CNTs) interact with relatively more of a polymer chain than lower aspect ratio NPs in a unit volume of NCs. By contrast, low aspect ratio NPs (e.g., nanorods, polyhedral oligomeric silsesquioxanes (POSS), silica spheres) have fewer surface interactions to break, resulting in poorer performing systems. Therefore, higher energy is required to break HARNP-PNCs systems than low aspect ratio NP-PNCs systems. The nanosphere represents a low aspect ratio NP while the nanoplatelet is a high aspect ratio NP. Expanded polymer chains interacts with the HARNPs with much fewer larger polymer chains than the low aspect ratio NPs.

Agglomeration of HARNPs reduces the effective aspect ratio of the nanoparticles and available surface for interaction. For example, the aspect ratio of an agglomeration containing 100 nanoplatelets is 1 while for a single nanoplatelet is 100. Further, the total surface area of the individual platelet system may be increased by 34 times over that of the agglomeration. The increased surface area produces a significant increase in platelet-polymer interactions, resulting in improved performance with only a small percent of NP addition. Therefore, obtaining complete dispersion becomes important in maximizing PNC performance.

The polymer matrix and nanoparticles need to favorably interact with each other at their interface, which plays a crucial role for mechanical properties. A central issue is that most polymer matrices and NPs are not compatible with each other. In order to facilitate compatibility, NPs need to be functionalized with surfactants that are compatible with both the NP and polymer matrix. The functionalization with surfactants, however, can have disadvantageous environmental impacts.

In general, there are four critical requirements for effective nanoparticle reinforcement of NC materials: 1) high aspect ratio of NPs, 2) interfacial compatibility between NPs and polymer matrix, 3) complete uniform dispersion, and 4) controlled orientation. As previously discussed, higher aspect ratio NPs exhibit the best reinforcement effect. Interfacial compatibility is vital to achieve effective load transfer between the NPs and the polymer matrix. For example, HARNP and the polymer matrix need to be compatible with each other in terms of surface wettability. Complete uniform dispersion of NPs results in higher surface area and a greater aspect ratio. Orientation of the HARNPs is critically important to enhance mechanical properties such as tensile modulus and strength compared to the mechanical properties obtained from NCs with only dispersion. Additionally, orientation can result in new and controllable anisotropic mechanical and functional properties in PNCs.

Properties of NCs are significantly affected by the fabrication method. For example, PNCs are commonly fabricated using melt mixing and solution mixing methods. The melt mixing methods are attractive due to being environmentally friendly, inexpensive, and continuous, but these methods lack the ability to disperse or orientate NPs, thus requiring the need for additional processing. The solution mixing methods are discontinuous and environmentally unfriendly. Examples of the melt and solution mixing methods include single and twin-screw extruders, two and three roll milling, ultrasonication mixing, solution mixing, water injected melt mixing, high shear mixing, in-situ polymerization, melt dispersion, batch mixing, and mechanical stirring. However, these fabrication methods have not been able to achieve NCs with the extent of theoretically predicted superior properties due to inadequate dispersion of agglomerated NPs as well as inadequate orientation of the NPs in the NC.

The two-roll mill is not suitable for production at industrial scale due to its difficulty to scale up and continuously processing with thermoplastic NCs. Single-screw extruders cannot provide sufficient dispersion in nanoscale even at low concentrations of weight percent of NPs, because of its low shear rate. Despite literature indicating that twin-screw extruders are the best dispersing machines among melt mixing techniques, the twin-screw extruders can only partially exfoliate or only disperse nanoparticles within polymer matrix. The twin-screw extruder is extensively used for mixing. Thus, the single screw extruder is not an efficient dispersive mixer because of insufficient high shear regions. In a single screw extruder the high shear region is created only within screw flight clearance. For instance, in a single flighted single screw extruder rotating at 100 revolutions per minute, 65.4% of molten PNC does not pass over the flight, 27.7% passes once, 5.9% twice, and 0.8% three times. However, to achieve properly dispersed NCs, the molten PNCs should encounter at least twenty passes through high shear zones.

PNCs have been fabricated mainly by melt mixing, in-situ polymerization, solution mixing, and ultrasonication, depending on polymer and NPs properties. The critical polymer properties included polymer solubility, viscosity of molten polymer, and polymer type such as thermoplastic or thermoset. In-situ and ultrasonication dispersion methods are not desirable from an environmental point of view. Melt mixing does not require an additional processing step, its simplicity to facilitate large scale production for commercial applications, and it is environmentally friendly by not requiring a solvent. Melt mixing dispersion levels are lower than those obtained through ultrasonication and in-situ polymerization because of the insufficient shear rate. Nevertheless, as mentioned earlier, these methods cannot work with high viscosity molten polymers. The NCs that are fabricated by current methods have not exhibited the extraordinary mechanical and conductive properties due to poor dispersion of the NPs.

During a typical melt mixing operation, dispersion occurs when hydrodynamic shear forces overcome the cohesion forces between the NPs. The cohesive force could be comprised of Van der Waals forces, electrostatic forces, and/or magnetic forces. However, the hydrodynamic shear force is only suitable for dispersion of NPs agglomerations when viscosity is high.

There are two types of agglomeration breakup mechanisms: rupture and erosion. The rupture mechanism occurs by splitting of the agglomeration into fewer numbers of aggregates. The rupture process requires relatively high shear forces, the hydrodynamic force needs to be at least five times higher than the cohesive force of the NPs. The particle erosion process is characterized by a continuous peeling of primary particles from the outer agglomerate surface. The particle erosion process occurs at lower hydrodynamic shear forces of two times the cohesive force depending on agglomerate behavior.

In order to achieve the predicted extraordinary mechanical and functional properties of PNC materials, the nanomaterials should be exfoliated, dispersed, and oriented within the polymer matrix during processing. Dispersion and orientation of nanomaterials within the polymer matrix can generally only occur after exfoliation of the HARNPs. Effective dispersion of the nanoparticles within the matrix is essential to ensure consistent and predictable properties throughout the composite. Therefore, a need exists in the art for a system that is capable of simultaneous dispersion and orientation of nanoparticles within a polymer matrix at high temperatures without solvents.

Dispersion of NPs within the polymer matrix is a complicated process because of the high viscosity of polymers, interfacial surface incompatibility between polymer matrix and NPs, and NP agglomeration. The high viscosities of molten polymers result in laminar creeping flows in PNCs processing. And if turbulent flow is created polymer degradation will occur due to viscous dissipative heating and the difficulty in removing the heat from the system. On the other hand, the high viscosity of molten polymer enables greater transfer of the shearing forces to the agglomeration.

Furthermore, controlling placement (i.e., orientation) of the dispersed NPs can be obtained only after proper dispersion. Such orientation methods commonly known in the art include shearing drawing, melt and electrospinning, equal channel angular extrusion, drawing, filtrating, applying magnetic and electric field, shear flow, spin coating, gas-liquid interfacial flow. However, none of these methods have produced a NC with properties close to the theoretical mechanical and functional property limits. For example, the drawing and the various spinning methods produce only one-dimensional materials such as fibers. Other methods such as electric and magnetic fields and shear flow orientation methods can produce two dimensional films or three dimensional bulk NCs; however, these fabrication methods have not yet reached practical usage. The shearing orientation method is the most promising method when compared with aforementioned orientation methods because it does not require special functional properties of the NPs. For example, a key factor for shear orientation is the high aspect ratio of the NPs while electrical and magnetic field orientations require anisotropic electrical and magnetic properties of the NPs, respectively.

Orientation does not require high energy as is necessary for dispersion. However, orienting HARNPs within a polymer matrix requires fully-developed, steady, laminar, shear flow (FDSLSF). Achieving FDSLSF is complicated due to surface roughness at the nanoscale. Therefore, a further need exists in the art for a system that is capable of generating FDSLSF to orient the PNCs.

A high degree of orientation and distribution of dispersed HARNPs throughout the matrix can give the greatest strength and stiffness along long axial direction, but the material is much weaker in the other directions. If the HARNPs are randomly oriented (i.e., isotropic) the mechanical and physical properties will be intermediate. Easier transfer of electrical and thermal energy will occurred along oriented direction of HARNPs when all HARNPs are oriented in same direction within polymer matrix. Achieving consistent uniform dispersion, alignment, and orientation of the HARNPs will allow optimal property improvement. Controlling the alignment and orientation of HARNPs in the polymer matrix can be tailored to best fit the NCs desired application.

It has been established that HARNPs are orientated along shearing direction in shear-induced flow because of the HARNPs anisotropic physical structure. Anisotropic properties of HARNP PNCs displayed very substantial physical effects in barrier, mechanical, and electrical properties. Generally, polymer nanoclay NCs show dramatic improvements of their barrier properties due to their tortuous gas diffusivity paths, known as Nielsen's theory. The barrier properties are enhanced when the exfoliated clay platelets are oriented. The oriented NCs have longer tortuous paths than randomly dispersed NCs.

The NC with oriented CNT always shows higher reinforcement along the oriented direction of the CNTs than randomly dispersed. Orientation of the HARNPs within polymer matrix exhibits enhanced tensile modulus and strength properties than the only dispersed HARNPs within polymer matrix. Similarly, it has been demonstrated that CNTs can dramatically enhance the electrical and thermal conductivities of polymers. The electrical and thermal conductivities along oriented direction are significantly higher than other directions.

Additionally, polymer chains are extended during the shear-induced orientation. Polymers with extended chains have denser packing than folded chains. Furthermore, the polymer crystallinity is increased due to polymer chain extension. Therefore, revolutionary progress in CNT application can only be realized when a technique is developed for the dispersion of the entangled CNTs and then controlling the dispersed CNTs orientation within the PNCs. The improved crystallinity leads to high strength, good toughness, high stiffness, low gas permeability, a higher melting point, good fatigue life, good abrasion resistance, and enhanced chemical resistance.

SUMMARY OF THE DISCLOSURE

It is therefore a primary object, feature, and/or advantage of the present disclosure to improve on or overcome the deficiencies in the art.

It is another object, feature, and/or advantage of the present disclosure to simultaneously achieve high degree of dispersion and orientation of HARNPs within a polymer matrix. The high shear thin film machine (HSTFM) can work with any viscous medium such as molten thermoplastics, liquid thermosets, and oil, because the higher viscosity enables greater transfer of the shearing forces to the agglomeration.

It is yet another object, feature, and/or advantage of the present disclosure to provide for an environmentally conscious and safe process that does not require solvents. The processed part fabrication time is short compared to techniques which use solvents because the HSTFM process does not require time to add and remove solvents from the polymer-NP mixture.

It is still yet another object, feature, and/or advantage of the present disclosure to continuously process HARNPs within polymer matrix. The continuous process makes the operating cost lower compared to discontinuous mixing techniques. Also, productivity of the HSTFM is higher than discontinuous processing such as batch processing. The HSTFM can produce high degree of dispersion and orientation of BARNP within polymer matrix within a continuous process.

It is another object, feature, and/or advantage of the present disclosure to reduce processing time. The HSTFM processes the HARNPs in approximately twenty seconds, including a dispersing time of ten seconds and orientation time of approximately ten seconds. The dispersing time is remarkably short in comparison with twin-screw extruder, batch mixing, and ultrasonication, whose dispersing times are approximately three minutes, ten minutes, and twenty minutes to several days, respectively.

It is yet another object, feature, and/or advantage of the present disclosure to increase polymer crystallinity during the orientation of the HARNPs within a molten polymer. Increasing the polymer crystallinity is caused by orientation of polymer chains in the HSTFM orienter. The increased polymer crystallinity increases mechanical and optical properties of the polymer.

It is still yet another object, feature, and/or advantage of the present disclosure to provide for a stable product after processing because the dispersed and orientated HARNP NC melt immediately solidified after processing. Thus, the HSTFM prevent reagglomeration of dispersed HARNPs within polymer matrix.

It is another object, feature, and/or advantage of the present disclosure to produce larger effective applied shear energy region of shaft.

It is yet another object, feature, and/or advantage of the present disclosure to provide for a self-cleaning heterogeneous catalyst reactor when the inside surface of stator and outside surface of shaft mixing region are coated by a catalyst. One challenge of current heterogeneous catalyst reactors is fouling of the catalysts over period of time. This issue could be solved when using the HSTFM mixer as heterogeneous reactor because the high shear rate which occurs within the HSTFM mixer will protect the catalysts surface from fouling.

It is still yet another object, feature, and/or advantage of the present disclosure to increase the types of NPs and polymer matrices for orientation. The requirement for HSTFM orientation requires only viscous liquid and high aspect ratio NPs. By contrast, electric field orientation requires anisotropic electrical properties from NPs while magnetic field orientation requires anisotropic magnetic properties from the NPs. Therefore the HSTFM orienter can find more general application than electrical and magnetic orientation methods.

It is another object, feature, and/or advantage of the present disclosure to control the temperature in mixing region and minimize viscous heat degradation.

These and/or other objects, features, and advantages of the present disclosure will be apparent to those skilled in the art. The present disclosure is not to be limited to or by these objects, features and advantages. No single embodiment need provide each and every object, feature, or advantage.

According to an aspect of the disclosure, a method for dispersion and simultaneous orientation of nanoparticles within a matrix is provided. A mixer having a shaft and a stator is provided. Further, an orienter having an angled stationary plate and a moving plate are provided. The nanoparticles and the matrix are fed into the mixer. A rotational force is applied to the shaft. Shearing forces disperse the nanoparticles within the matrix. The dispersed mixture is outputted onto the moving plate. The moving plate is forced across the angled stationary plate. Fully developed laminar shear flow orients the dispersed mixture.

According to another an aspect of the disclosure, a device to disperse particles within a matrix includes a housing having a center axis, an outer surface and an inner surface. The device also includes an inlet in fluid connection with the housing configured to receive a mixture of the particles and the matrix, and a shaft within the housing with a length defined between the inlet and an outlet. The shaft has a substantially constant outer circumference and rotating about the center axis. The device may further include a rupture portion of the shaft having surface interruptions extending inwardly from the outer circumference, and an erosion portion of the shaft between the rupture portion of the shaft and the outlet. The erosion portion has a smooth outer surface along the outer circumference. Dispersion in the mixture occurs between the inner diameter of the housing and along substantially an entirety of the length of the shaft between the inlet and the outlet. Additionally, the device may include a screw groove along the outer circumference between the inlet and rupture portion.

According to another an aspect of the disclosure, a device to orient particles within a matrix, the device includes a moving plate adapted to receive a mixture of the particles and the matrix, the moving plate having an upper surface and an opposite bottom surface. The device includes an angled stationary plate having a lower edge and a higher edge. A gap exists between the top surface of the upper surface of the moving plate and the lower edge of the angled stationary plate. The top surface of the moving plate moves linearly from the higher edge of the angled stationary plate to the lower edge of the angled stationary plate. The mixture disposed on the top surface of the moving plate is forced through the gap to orient the particles within the matrix.

BRIEF DESCRIPTION OF THE DRAWINGS

Illustrated embodiments of the disclosure are described in detail below with reference to the attached drawing figures, which are incorporated by reference herein, and where:

FIG. 3A is a front perspective view of a mixer in accordance with an illustrative embodiment;

FIG. 3B is a front perspective view of a mixer in accordance with an illustrative embodiment;

FIG. 3C is a front perspective view of a mixer in accordance with an illustrative embodiment;

DETAILED DESCRIPTION OF THE PREFERRED EMBODIMENTS

Figure 1A:
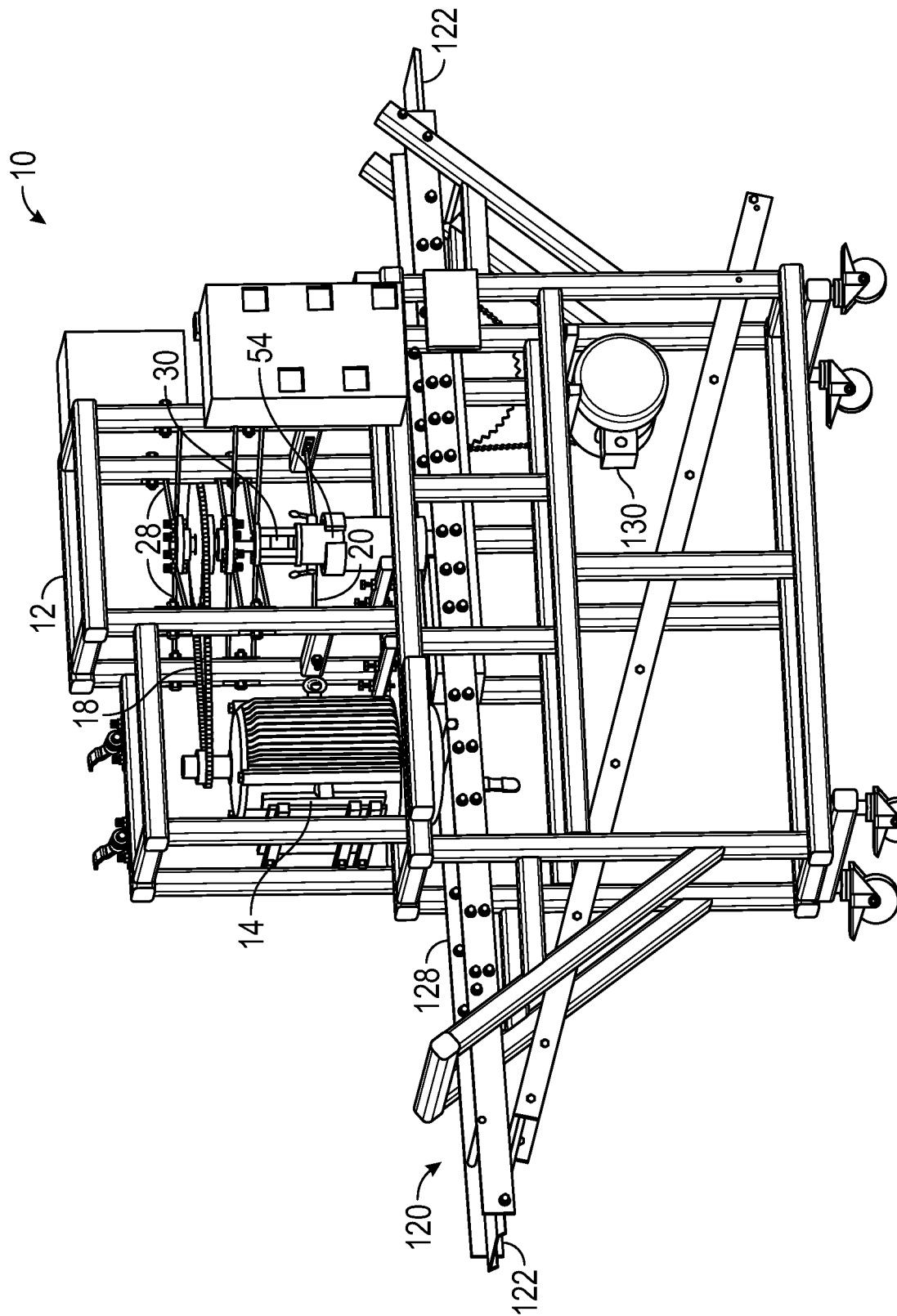
FIG. 1A is a front perspective view of a machine in accordance with an illustrative embodiment.
Figure 1B:
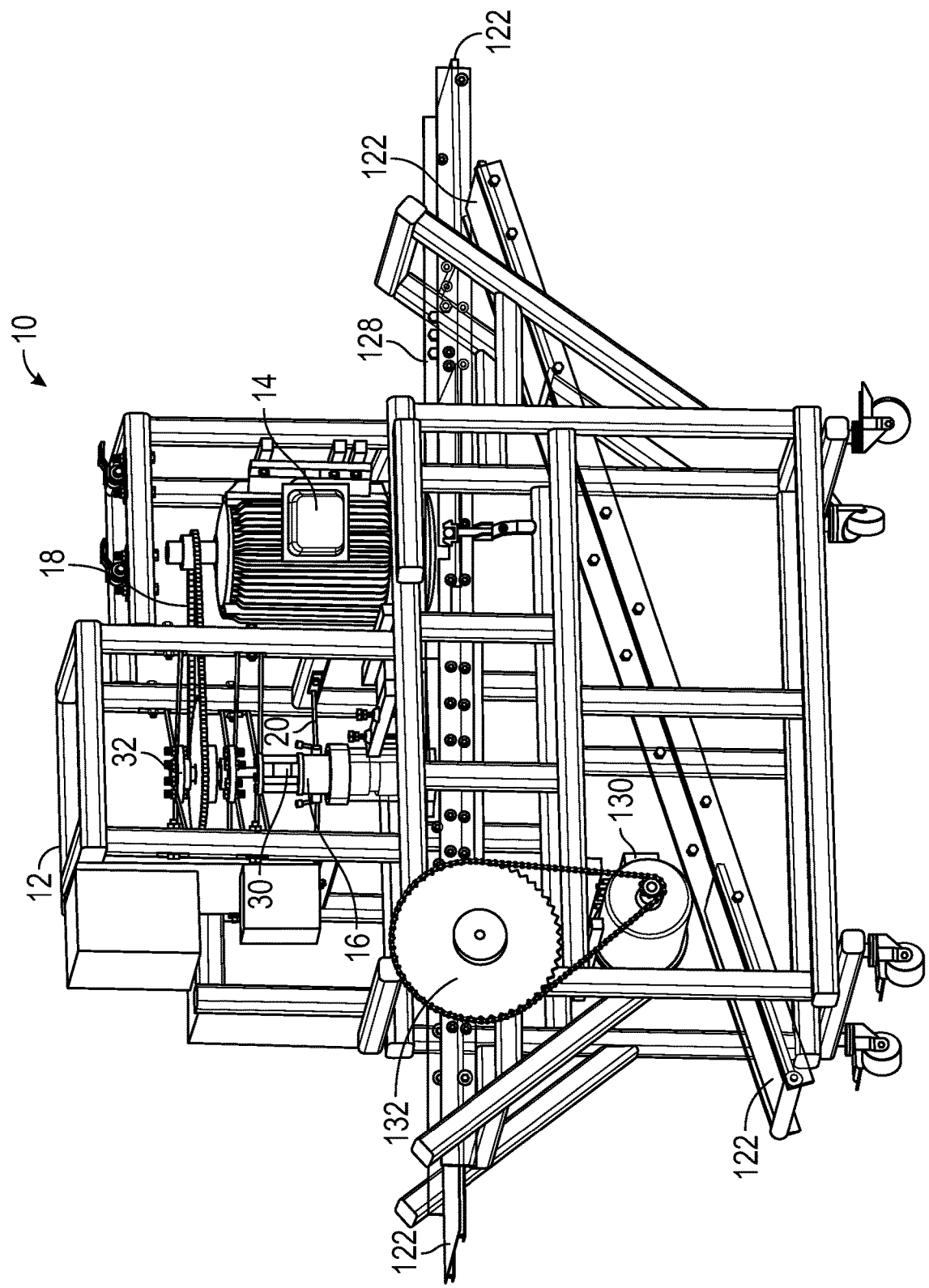
FIG. 1B is a rear perspective view of a machine in accordance with an illustrative embodiment.
Figure 2A:
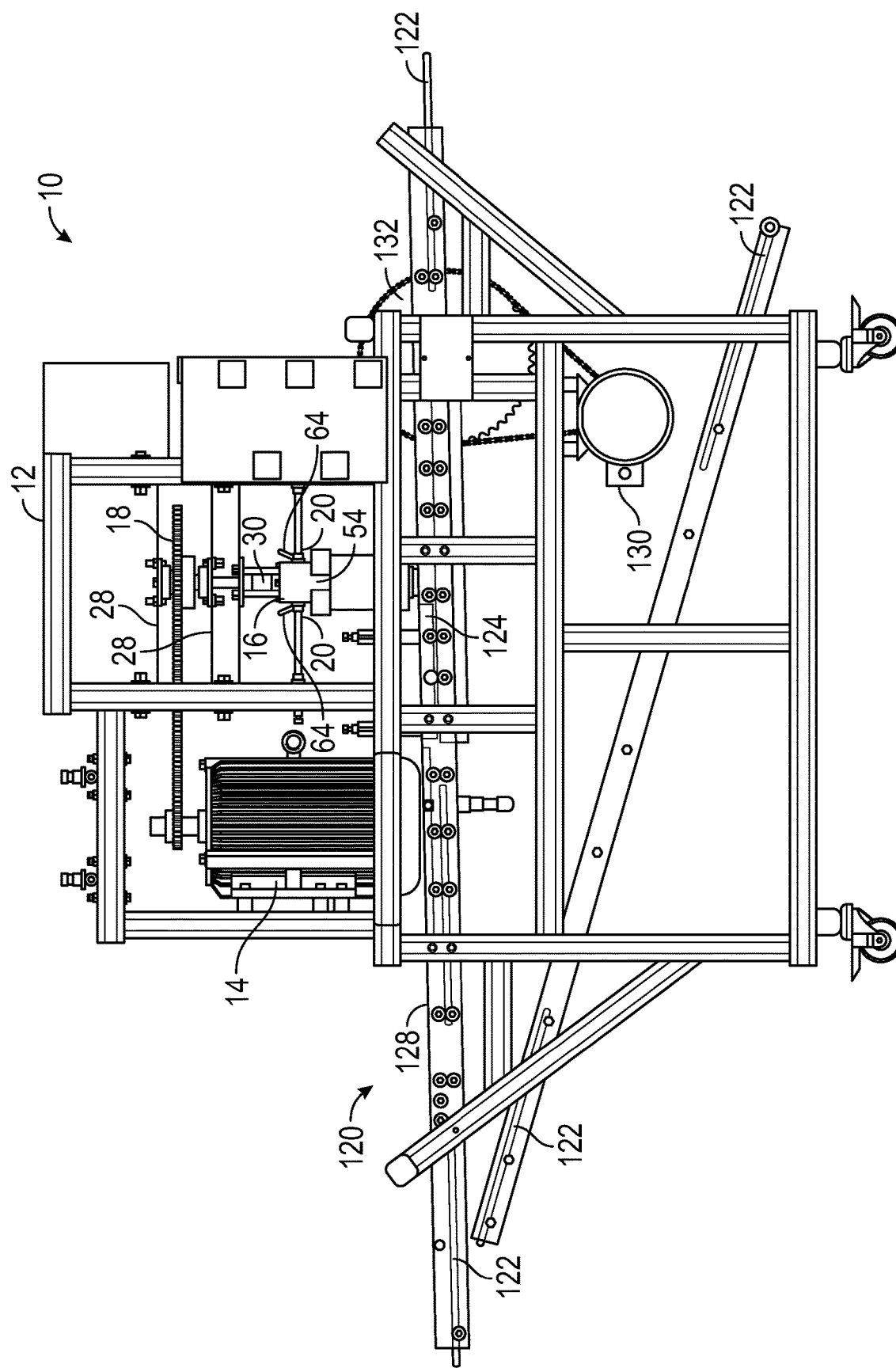
FIG. 2A is a side elevation view of a machine in accordance with an illustrative embodiment.
Figure 2B:
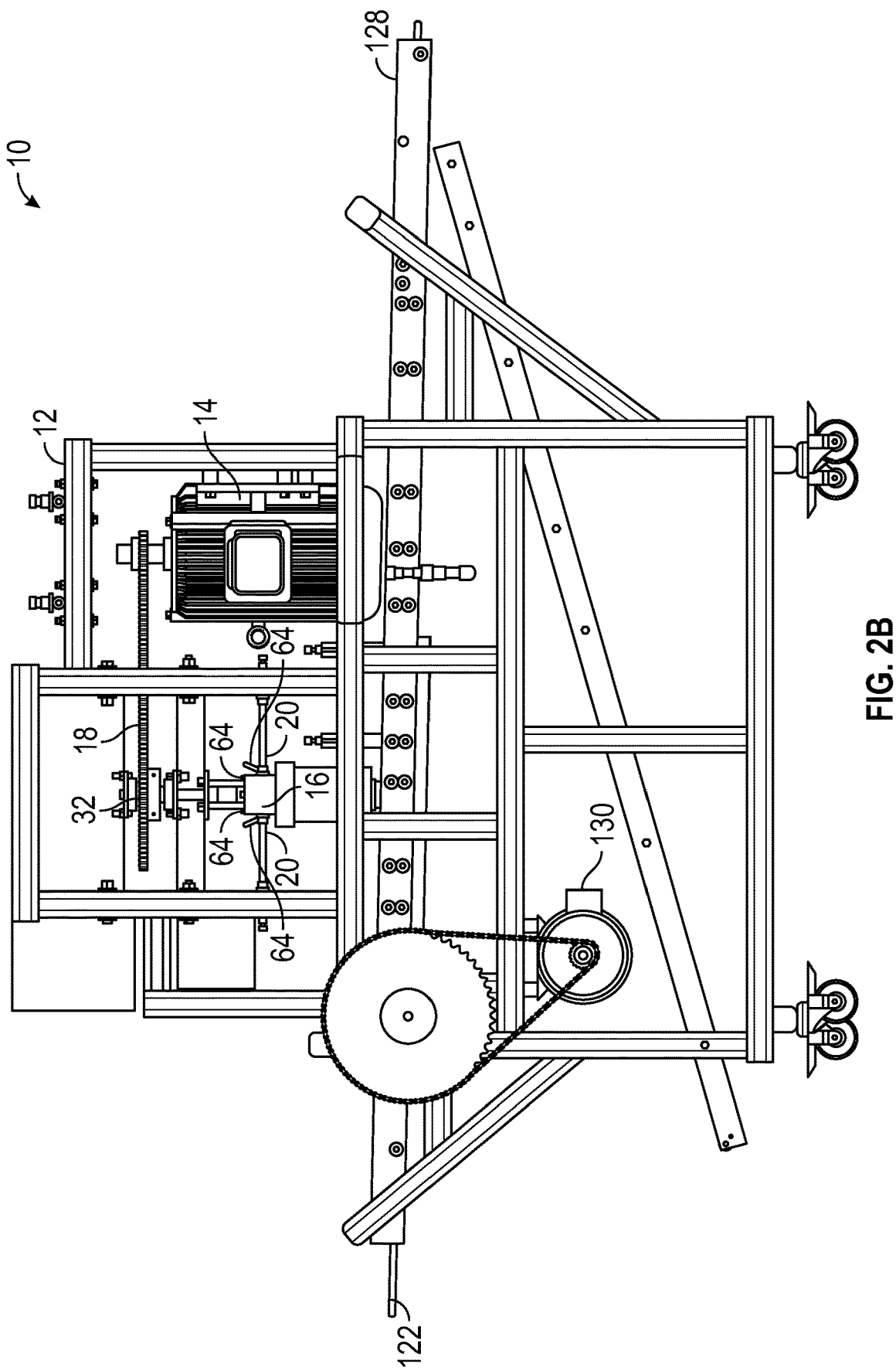
FIG. 2B is a side elevation view of a machine in accordance with an illustrative embodiment.

FIGS. 1A, 1B, 2A and 2B illustrate a high shear thin film machine 10 in accordance with an exemplary embodiment of the present disclosure. The machine 10 includes a frame 12 upon which the components of the machine 10 are mounted. The present disclosure, however, contemplates that the components may be installed on any suitable structure or surface to achieve the objects of the invention.

A motor 14 mounted on the frame 10 is operably connected to a mixer 16. A preferred embodiment includes a high horsepower electric motor, but the present disclosure contemplates the motor 14 may be powered by petrochemical, solar, stream, and the like. In the exemplary embodiment depicted in FIG. 1, the motor 14 is connected to the mixer 16 through a chain 18. The present disclosure envisions other means of connection, including belts, cables, gear box, and the like. In an alternate embodiment, the output shaft of the motor 14 may be coupled directly to the mixer 16, thereby eliminating the need for a chain, belt, and the like.

Figure 4:
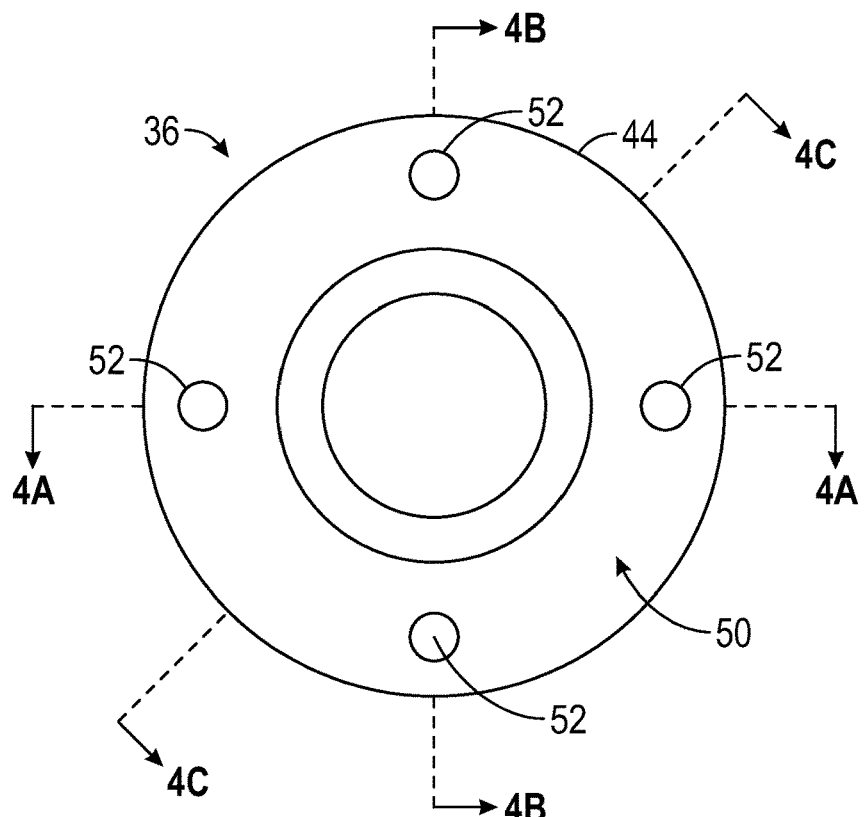
FIG. 4 is a top plan view of a top portion of a stator in accordance with an illustrative embodiment.
Figure 4A:
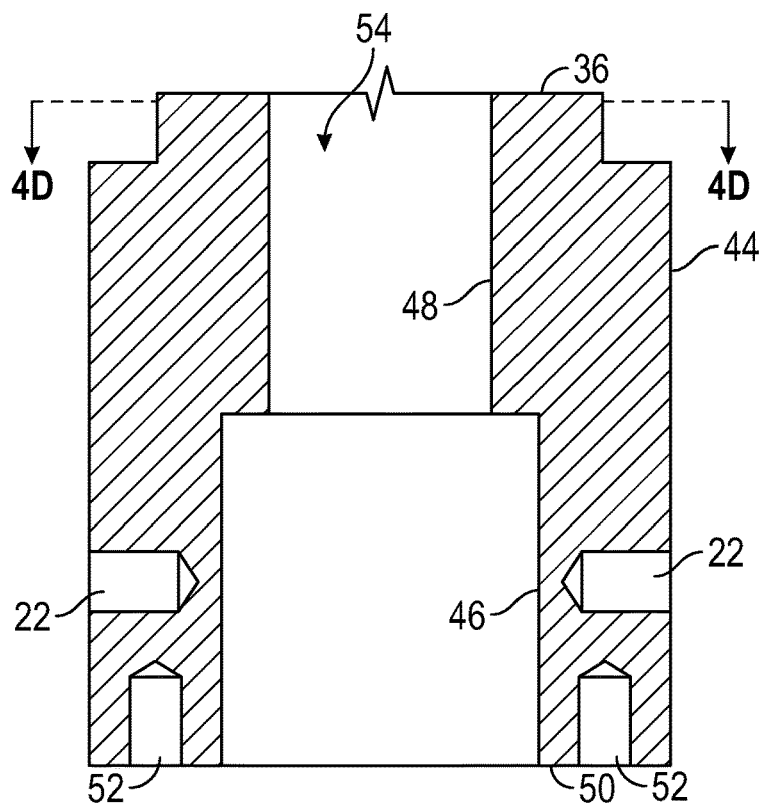
FIG. 4A is a cross-sectional view of the top portion of a stator of FIG. 4 taken along section A-A.
Figure 4B:
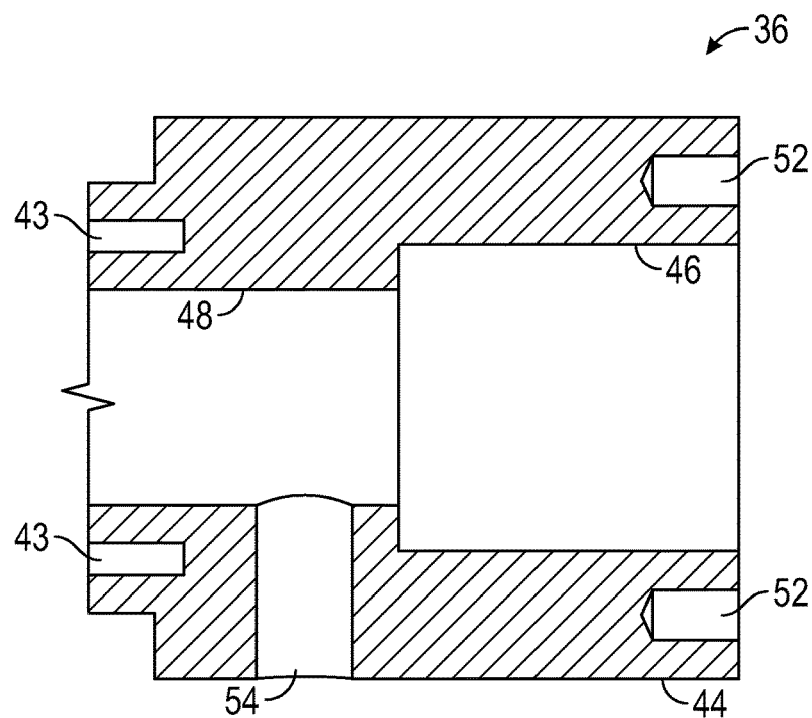
FIG. 4B is a cross-sectional view of the top portion of a stator of FIG. 4 taken along section B-B.
Figure 4C:
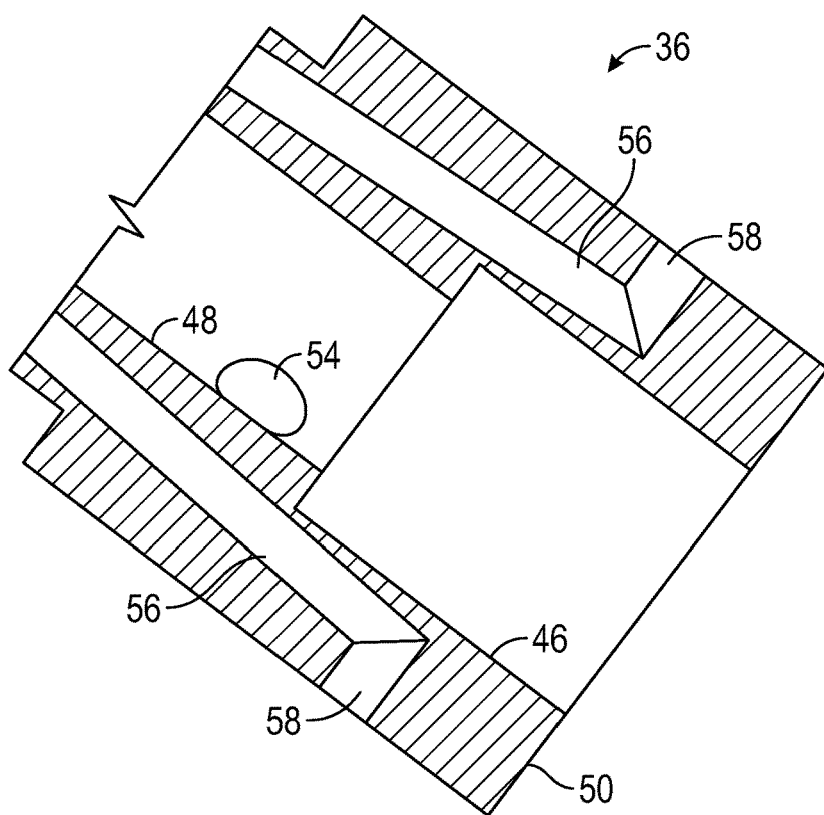
FIG. 4C is a cross-sectional view of the top portion of a stator of FIG. 4 taken along section C-C.
Figure 4D:
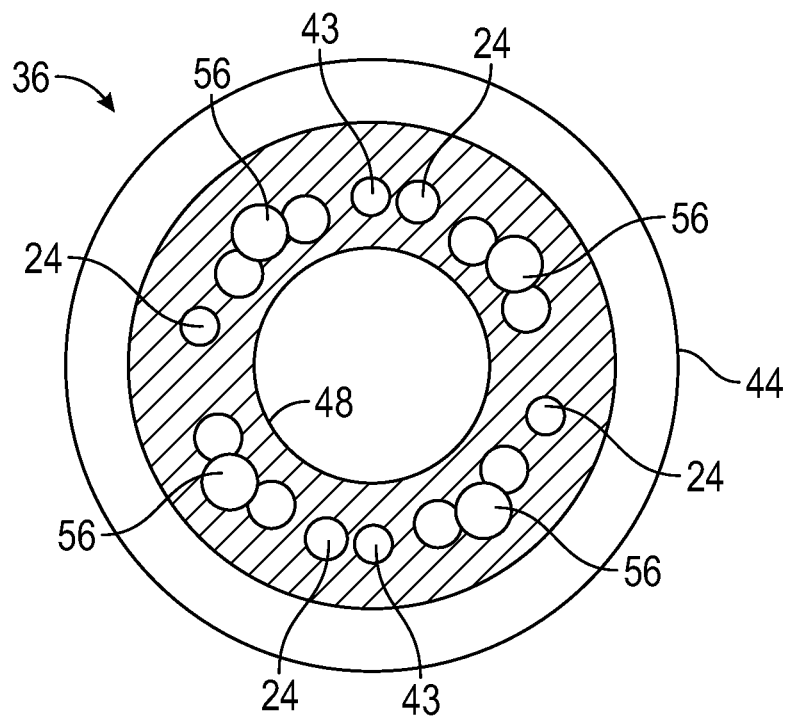
FIG. 4D is a cross-sectional view of the top portion of a stator of FIG. 4 taken along section D-D.

The mixer 16 may be secured to the frame 12 through any means commonly known in the art. For example, in the illustrated embodiment of FIGS. 1A, 1B, 2A and 2B, a plurality of frame mounts 20 may connect with frame mount holes 22 (FIG. 4A) within a top portion of the stator 26. A plurality of connecting rods 28 may secure additional components of a motor column, including but not limited to, the coupler 30 and chain connection 32.

Referring to FIGS. 3A-3C, the mixer 16 may be comprised of the stator 26 and a shaft 34. The stator 26 may be comprised of the top portion 36, a middle portion 38, and a bottom portion 40. The stator 26 may be constructed from American Iron and Steel Institute (AISI) 1018 steel to decrease slippage between the boundary of the molten PNCs and shaft 34 due to higher surface tension on the boundary. The present disclosure contemplates other suitable materials, including but not limited to mild to low carbon steels and cold-rolled steels such as 304 stainless steel and 12L14 carbon steel.

The top portion 36, the middle portion 38, and the bottom portion 40 may be connected through a bolt 42 that extends through the three portions, as shown illustratively in FIG. 3B. The bolt 42 extends through corresponding assembly holes 24 in each of the three portions. Further, the precise alignment of the top portion 36, the middle portion 38, and the bottom portion 40 may be ensured through alignment pins 41 engaging alignment holes 43 in each of the three portions. While the illustrated embodiment shows a stator 26 comprised of three portions, the present disclosure contemplates that any number of portions may be implemented. For example, the stator 26 may be of unitary construction, particularly with advances and/or refinement in the manufacturing processes used to construct the stator 26.

The top portion 36 of the stator 26 is shown illustratively in FIGS. 4A, 4B, 4C and 4D. The top portion 36 includes an outer circumference 44, a first inner circumference 46, and a second inner circumference 48. In an exemplary embodiment, the outer circumference 44, the first inner circumference 46, and the second inner circumference 48 are coaxial to one another, resulting in a cylinder with a tiered interior. The second inner circumference 48 is sized and shaped to the outer surface of the shaft 34. The first inner circumference 46 is sized and shaped to the outer surface of a seal holder 94, which is discussed in detail below.

With a top surface 50 of the top portion 36 of the stator 26 is a plurality of axial mounting holes 52. The plurality of axial mounting holes 52 are adapted to connect the coupler 30 shown illustratively in FIGS. 1A, 1B, 2A and 2B. In an exemplary embodiment, the top portion 36 has four axial mounting holes 52 disposed at twelve o'clock, three o'clock, six o'clock and nine o'clock positions when the top portion 36 of the stator 26 is viewed from above. However, the present disclosure contemplates any number and/or arrangement of axial mounting holes without deviating from the objects of the present disclosure.

The top portion 36 of the stator 26 also has an inlet 54 for the polymer and/or nanoparticles. The location of the inlet 54 on the machine 10 is also shown illustratively in FIGS. 1A and 2A. The inlet 54 is connected to means for providing the polymer and/or nanoparticles. For example, in an exemplary embodiment, the inlet 54 is connected to a screw extruder that provides the polymer-nanoparticle mixture. In an alternate embodiment, a second inlet (not shown) may be associated with the mixer 16, wherein an inlet receives the polymer and the other inlet receives the nanoparticles. Further, the present disclosure contemplates that the polymer and nanoparticles may be directly fed into the mixer of the machine 10 without the need of a screw extruder. Other means may include but are not limited to pneumatics, hydraulics, and the like.

Referring to FIGS. 3B, 3C, 4C and 40, the stator 26 may contain one or more cooling channels 56 disposed within the wall of the stator 26. The cooling channels 56 address viscous dissipation heating due to the high viscosity of the nanocomposite melts. Each of the cooling channels 56 is associated with a port 58. The port 58 may be an inlet port or an outlet port. As shown illustratively in FIGS. 2A and 2B, each of ports 58 connected to a coupler 64, which is connected to a tube (not shown) adapted to either supply or receive fluid. A pump (not shown) may pump a fluid (e.g., coolant, water, air, etc.) through the couplers 64 into the ports 58, after which the fluid travels down the cooling channels 56 to cool the receive the viscous dissipated heat within the wall of the stator 26. The cooling channels 56 extend from the top portion 36, through the middle portion 38, to the lower portion 40 of the stator 26. In the illustrated embodiment, the cooling channels 56 are comprised of three overlapping holes that effectively comprise a slot. The present disclosure contemplates cooling channels 56 of any size and shape without deviating from the objects of the present disclosure. For example, the cooling channels 56 may be of rectangular cross section to provide for additional fluid flow. Further, each of the cooling channels 56 may be threaded 66 to not only increase the heat transfer surface area of the channels 56, but also promote turbulence of the fluid within the channels 56. The threading 66 is illustrated in detail in FIGS. 5B and 5C.

Figure 9A:
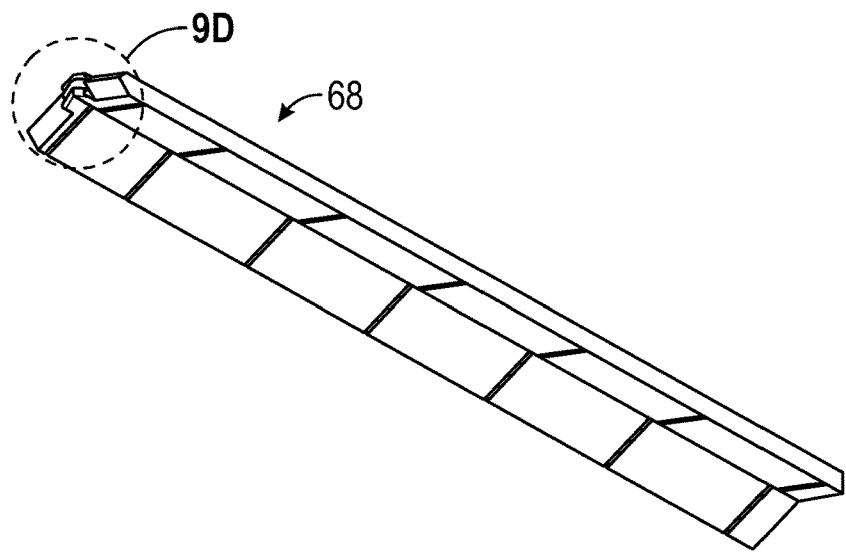
FIG. 9A is a front perspective view of a cooling channel modifier in accordance with an illustrative embodiment.
Figure 9B:
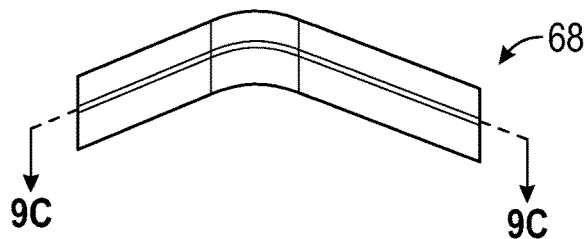
FIG. 9B is a front elevation view of a cooling channel modifier in accordance with an illustrative embodiment.
Figure 9C:
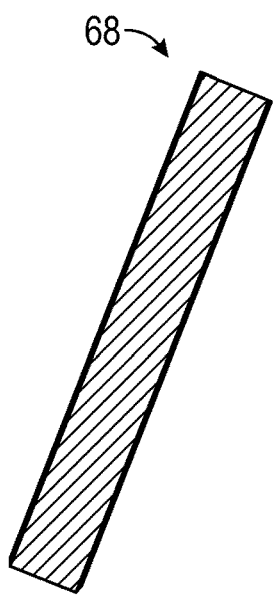
FIG. 9C is a cross-sectional view of the cooling channel modifier of FIG. 9B taken along section C-C.
Figure 9D:
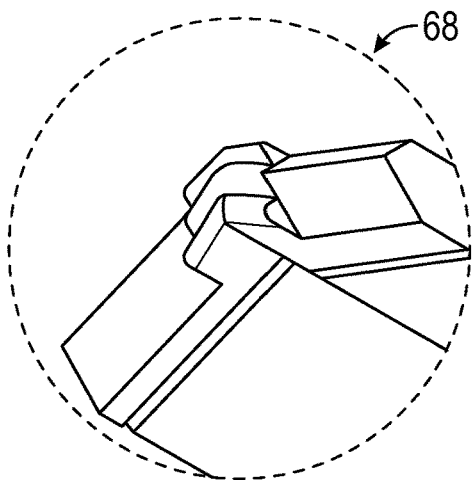
FIG. 9D is a detailed view of the cooling channel modifier of FIG. 9A within section circle D.
Figure 10:
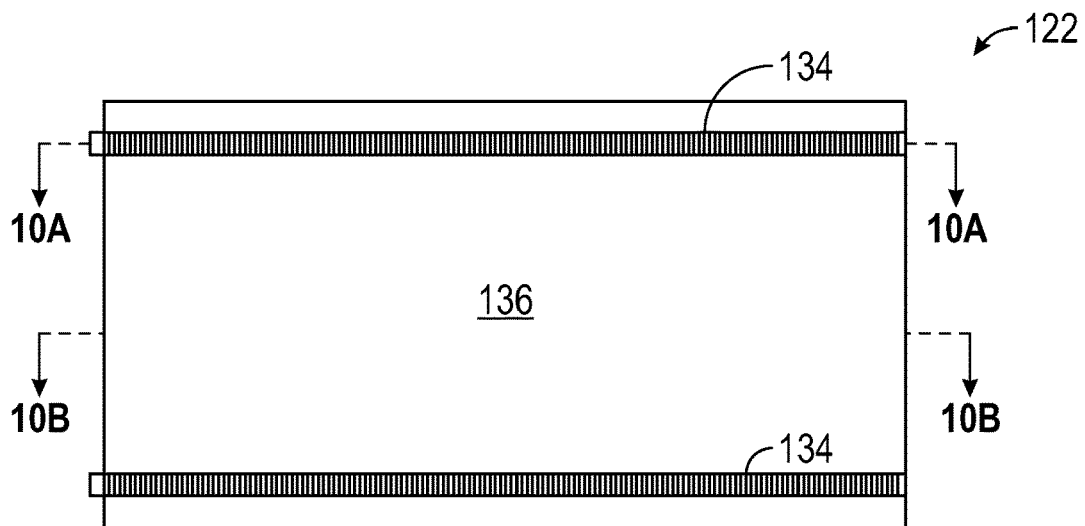
FIG. 10 is a bottom plan view of a moving plate in accordance with an illustrative embodiment.
Figure 10A:
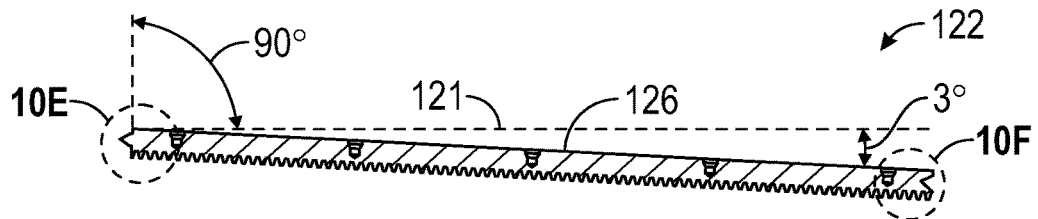
FIG. 10A is a cross-sectional view of the moving plate of FIG. 10 taken along section A-A.
Figure 10B:
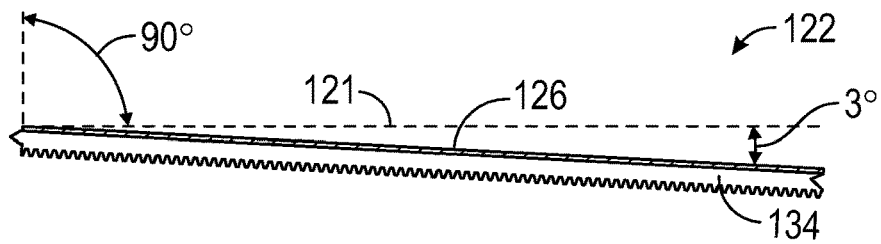
FIG. 10B is a cross-sectional view of the moving plate of FIG. 10 taken along section line B-B.
Figure 10C:
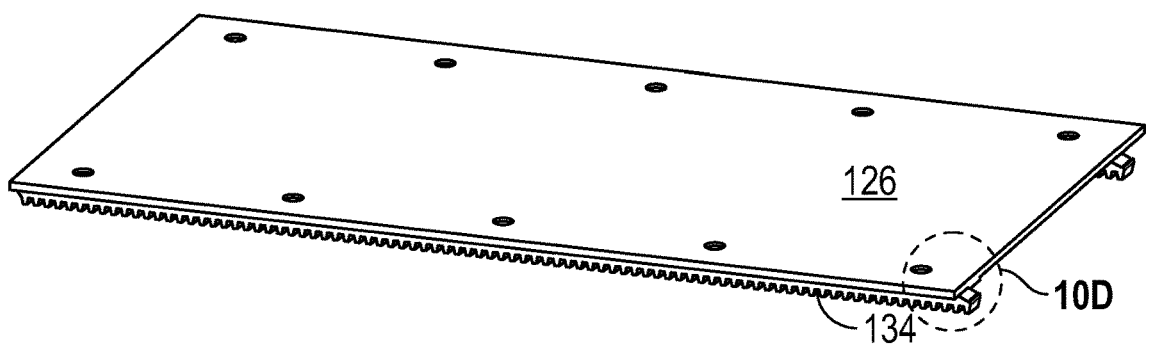
FIG. 10C is a front perspective view of a moving plate in accordance with an illustrative embodiment.
Figure 10D:
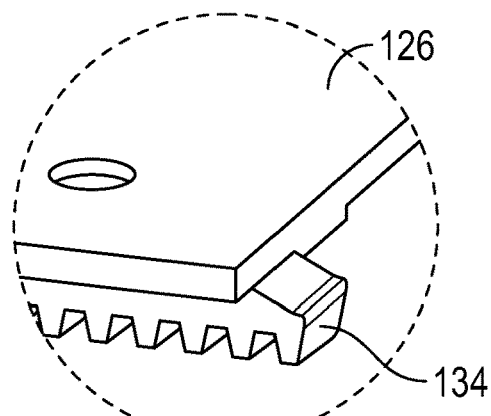
FIG. 10D is a detailed view of a portion of the moving plate of FIG. 10C within section circle D.
Figure 10E:
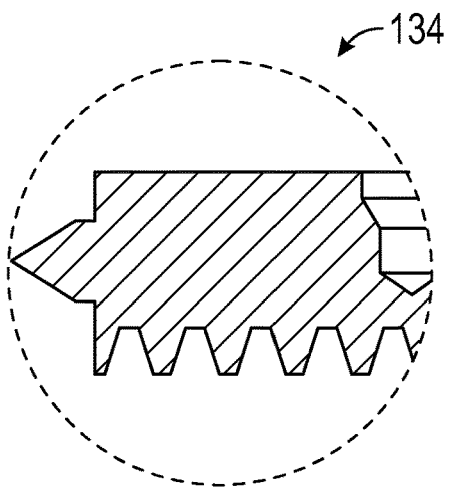
FIG. 10E is a detailed view of a portion of the moving plate of FIG. 10A within section circle E.
Figure 10F:
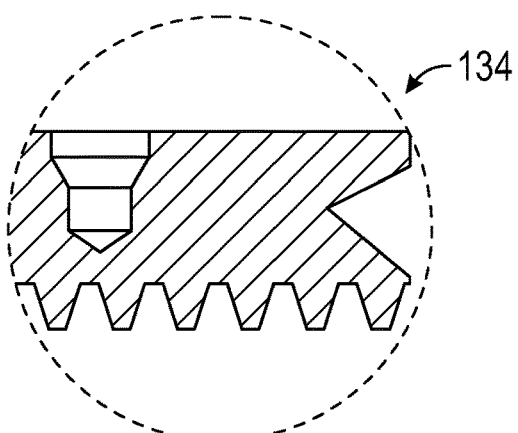
FIG. 10F is a detailed view of a portion of the moving plate of FIG. 10A within section circle F.

Furthermore, each of the cooling channels 56 may receive a cooling channel modifier 68, as shown illustratively in FIGS. 9A, 98, 9C and 90. The cooling channel modifier 68 may be sized and shaped to be inserted into a cooling channel 56. The cooling channel modifier 68 is designed to increase the velocity of pumped fluid and further increase the turbulence of the same. In the illustrated embodiment, the cooling channel modifier 68 has a rectangular cross section. The cooling channel modifier 68 is comprised of a piece metal crimped at one end, as detailed in FIG. 9D. The present disclosure contemplates any number of cooling channel modifiers consistent with the objects of the present disclosure. For example, the cooling channel modifier 68 may be comprised of a threaded bolt-like structure to further increase surface heat and fluid turbulence. In another example, the cooling channel modifier 68 may be a spring-like device to maximize the amount of fluid pumped while promoting fluid turbulence. In yet another example, the cooling channel modifier 68 may be formed integrally with the stator 26.

Figure 5:
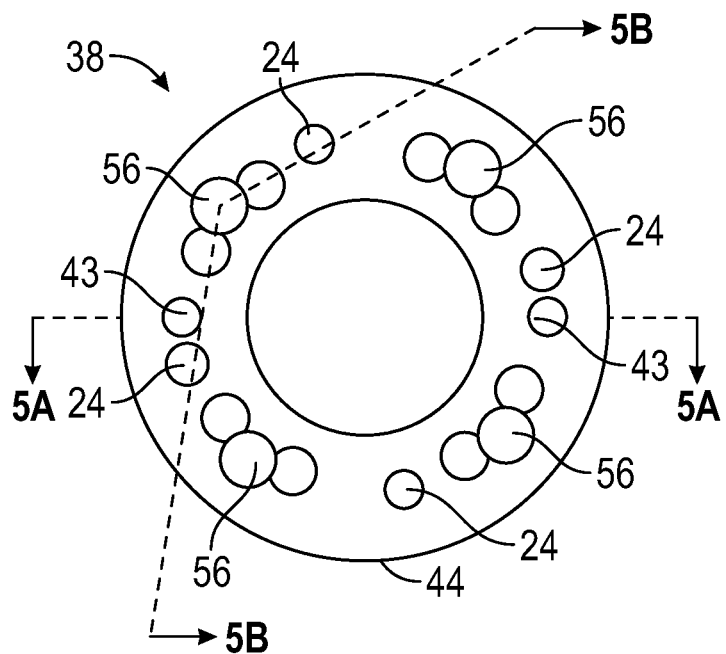
FIG. 5 is a top plan view of a middle portion of a stator in accordance with an illustrative embodiment.
Figure 5A:
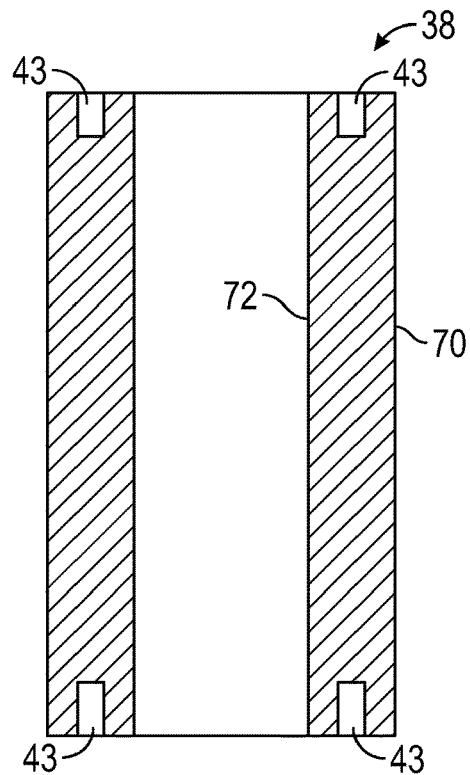
FIG. 5A is a cross-sectional view of the middle portion of a stator of FIG. 5 taken along section A-A.
Figure 5B:
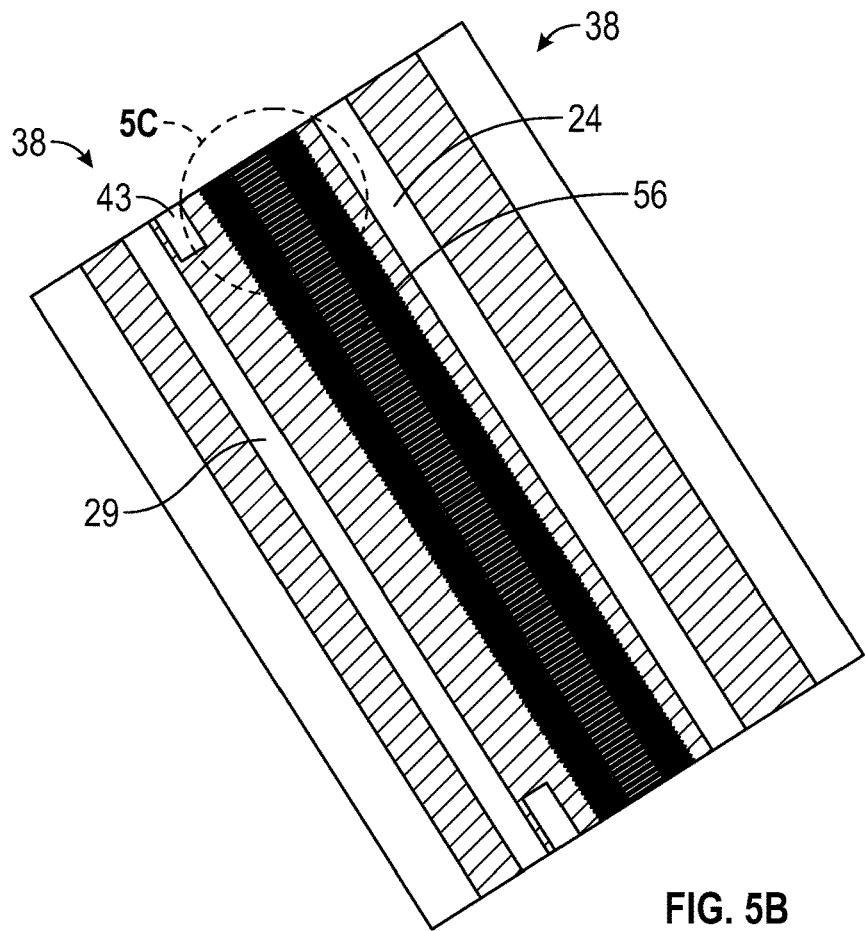
FIG. 5B is a cross-sectional view of the middle portion of a stator of FIG. 5 taken along section B-B.
Figure 5C:
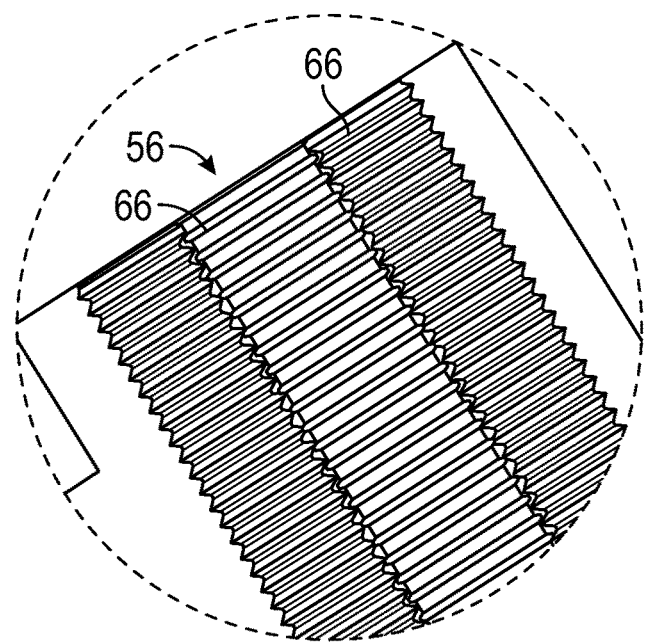
FIG. 5C is a detailed view of the middle portion of the stator of FIG. 5B within section circle C.
Figure 6:
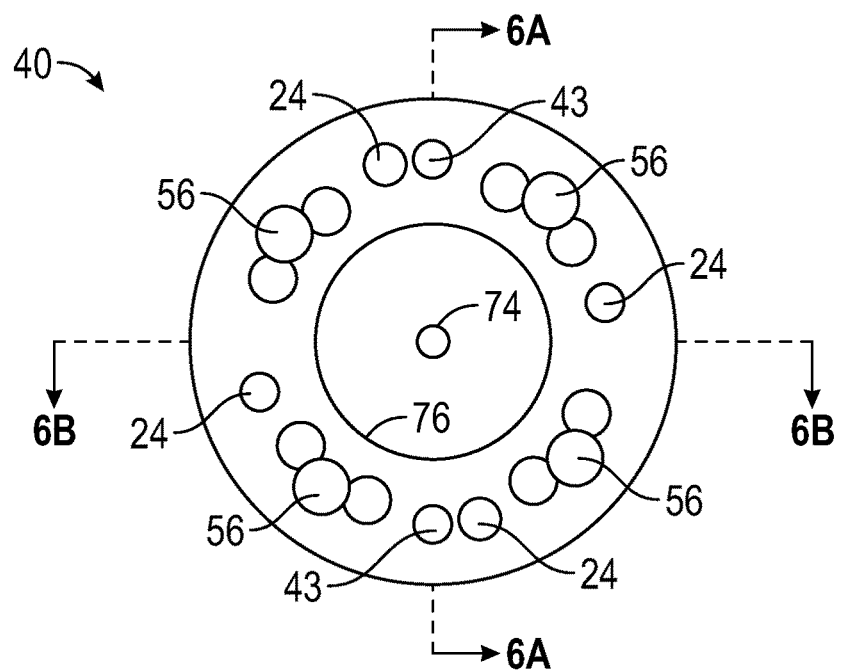
FIG. 6 is a top plan view of a bottom portion of a stator in accordance with an illustrative embodiment.
Figure 6A:
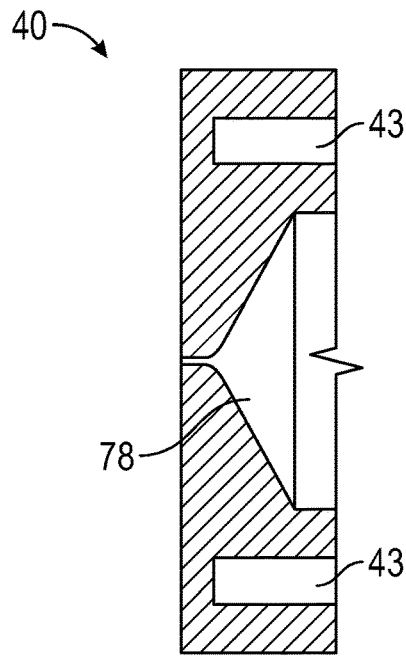
FIG. 6A is a cross-sectional view of the bottom portion of a stator of FIG. 6 taken along section A-A.
Figure 6B:
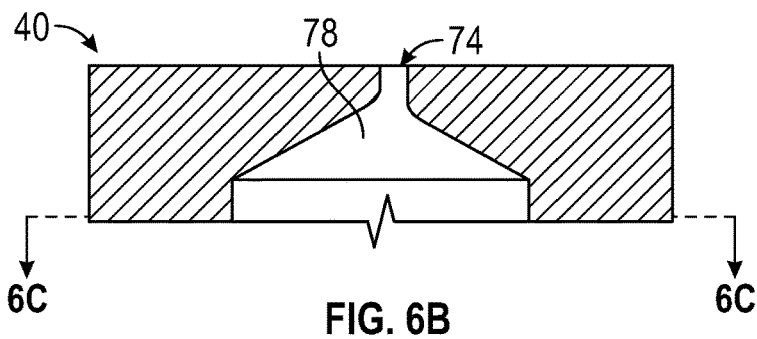
FIG. 6B is a cross-sectional view of the bottom portion of a stator of FIG. 6 taken along section B-B.
Figure 6C:
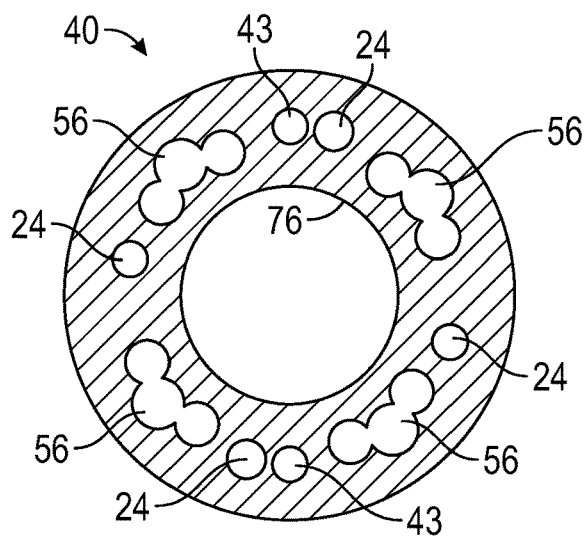
FIG. 6C is a cross-sectional view of the bottom portion of a stator of FIG. 6B taken along section C-C.
Figure 7:
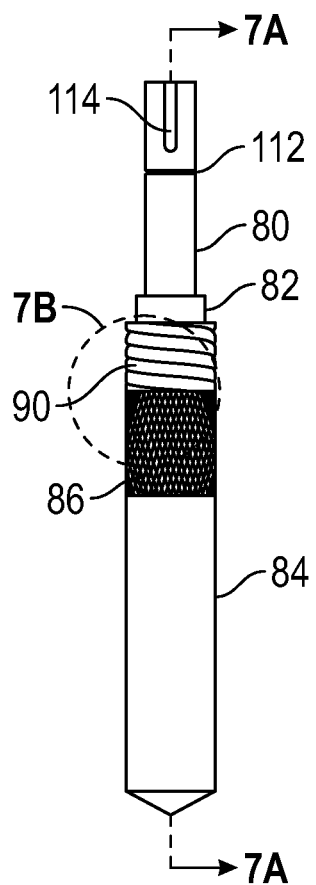
FIG. 7 is a front elevation view of a shaft in accordance with an illustrative embodiment.
Figure 7A:
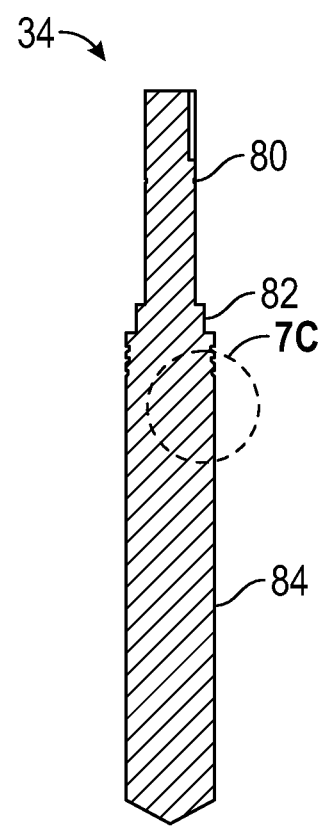
FIG. 7A is a cross-sectional view of the shaft of FIG. 7 taken along section A-A.
Figure 7B:
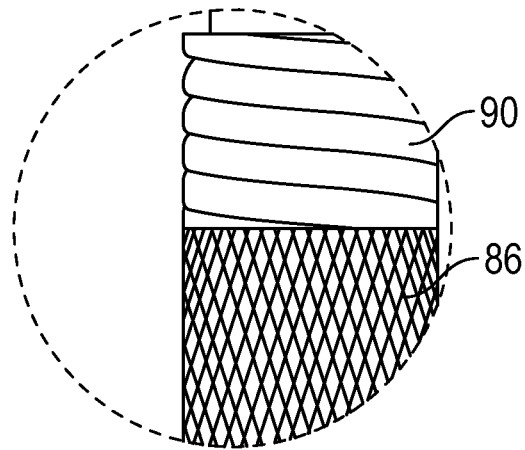
FIG. 7B is a detailed view of the shaft of FIG. 7 within section circle B.
Figure 7C:
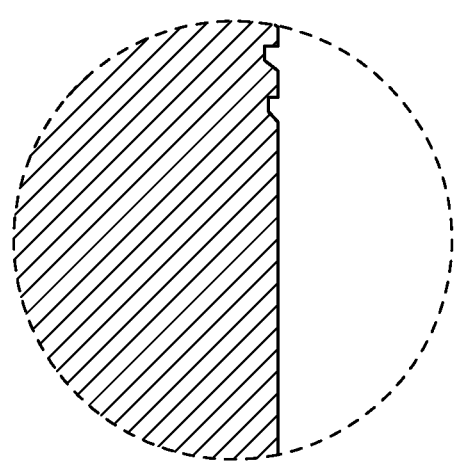
FIG. 7C is a detailed view of the shaft of FIG. 7A within section circle C.

Referring to FIGS. 5, 5A and 58, the middle portion 38 of the stator 26 may be comprised of an outer circumference 70 and an inner circumference 72. The inner circumference 72 of the middle portion 38 corresponds to the second inner circumference 48 of the top portion 36. As previously discussed herein, the middle portion 38 may include alignment holes 43 adapted to receive alignment pins 41, assembly holes 24 adapted to receive assembly bolts 42, and cooling channels 56 adapted to receive a cooling channel modifiers 68.

A lower portion 40 in accordance of an exemplary embodiment is illustrated in FIGS. 6, 6A, 6B and 6C. As previously discussed herein, the lower portion 40 may include alignment holes 43 adapted to receive alignment pins 41, assembly holes 24 adapted to receive assembly bolts 42, and cooling channels 56 adapted to receive a cooling channel modifiers 68. Further, the lower portion contains an outlet hole 74. In an exemplary embodiment, the outlet hole 74 is eccentrically placed from the center of an inner circumference 76 of the lower portion 40. The present disclosure, however, contemplates the outlet hole 74 may be centered as well. The outlet hole 74 may be associated with a funneling channel 78 that tapers from the inner circumference 76 to the outlet hole 74. The funning channel 78 may be the frustum of a cone, as shown illustratively in the figures. The present invention contemplates other types of outlet holes 74, including but not limited to slits, coat hanger dies, and the like, to promote a thin aspect ratio at the outlet.

Referring back to FIGS. 3A, 3B and 3C, the shaft 34 is disposed within the stator 26. An exemplary shaft 34 is illustrated in FIGS. 7, 7A, 78 and 7C. The shaft 34 may contain a neck portion 80, a middle portion 82, and a main portion 84. The main portion 84 is sized and shaped to create a small gap with the second inner circumference 48 of the top portion 36, the inner circumference 72 of the middle portion 38, and the inner circumference 76 of the lower portion 40. In a preferred embodiment, the gap is 0.1 millimeters. Thus, the present disclosure contemplates gaps of similar dimensions without deviating from the invention.

The main portion of the shaft 84 may contain a knurled region (or rupture region) 86 and a smooth region (or erosion region) 88. The knurled region 86 is disposed proximate to the inlet 54 relative to the smooth region 88. The knurled region 86 produces higher and more chaotic shearing forces to create aggressive mixing with higher flow rate. In a preferred embodiment, the knurled region 86 is approximately one-fourth the length of the main region 84 of the shaft 34. The rupture region 86 was created shorter than the erosion region 88 because rupturing the agglomerations requires higher shear force and less time than erosion. In the erosion region, primary nanoparticle is continuously peeled apart from smaller aggregates in the erosion region, which requires more time and less energy. As mentioned above, the gap between the erosion region 88 and the stator 26 may be 0.1 millimeters. A gap between rupture region 86 and stator 26 may be a slightly smaller (e.g., approximately 0.02 millimeters smaller). In addition, the knurled region 86 assists in increasing the flow rate of the NPC within the mixer 16.

The main portion 84 of the shaft 34 may include a screw groove region 90. The screw groove region 90 may be disposed adjacent to the knurled region 86 opposite the smooth region 88. The screw groove region 90 may further be disposed proximate to the inlet 54 relative to the knurled region 86. The screw groove region 90 assists in moving the polymer-nanoparticle mixture downwardly into the mixture (i.e., towards the knurled region 86). In an exemplary embodiment gap between shaft 34 and stator 26 in this screw groove region 90 may be a slightly smaller (e.g., approximately 0.03 millimeters smaller) than the rupture region.

The middle portion 82 of the shaft 34 may be operable connected to a seal 92 and seal holder 94, as shown illustratively in FIGS. 3A and 3C. The seal 92 is required to withstand the demands of the application. In particular, the application may have temperatures exceeding 230° C. and pressures of approximately one thousand kilopascals. In a preferred embodiment, the seal 92 may be an O-ring comprised of polytetrafluoroethylene (PTFE). The present disclosure contemplates other seals comprised of Kalrez perfluoroelastomer, spring-loaded single lips, and the like.

Figure 8A:
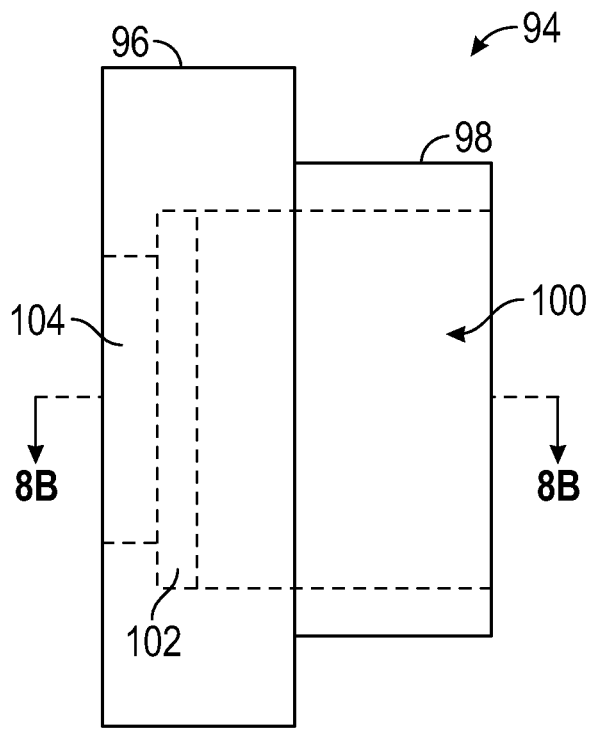
FIG. 8A is a front elevation view of a seal holder in accordance with an illustrative embodiment.
Figure 8B:
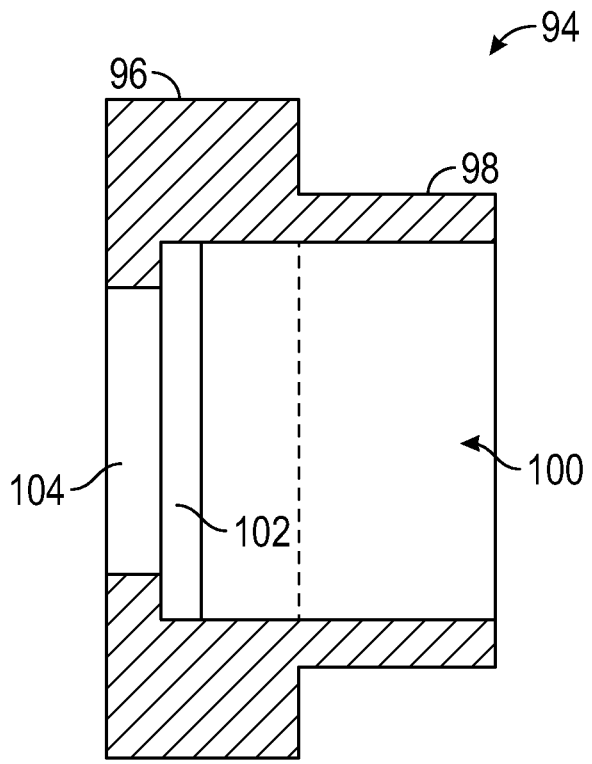
FIG. 8B is a cross-sectional view of the seal holder of FIG. 8 taken along section B-B.

An exemplary seal holder 94 is illustrated in FIGS. 8A and 8B. The seal holder 94 may include a first outer circumference 96 sized to fit within the first inner circumference 46 of the top portion 38 of the stator 26, and a second outer circumference 98 sized to fit within the second inner circumference 48 of the top portion 38 of the stator 26. The seal holder 94 may further include a first inner portion 100 sized to accommodate the middle portion 82 of the shaft 34, a second inner portion 102 sized to accommodate the seal 92, and a third inner portion 104 sized to accommodate a portion of the neck 80 of the shaft 34. In an exemplary embodiment, the seal holder 94 may be constructed from AISI 1018 steel but the present disclosure contemplates other suitable materials, including but not limited to mild to low carbon steels and cold-rolled steels such as 304 stainless steel and 12L14 carbon steel. Referring back to FIGS. 3A, 3B and 3C, one or more ball bearings 106 may be disposed within the top portion 38 of the stator 26 adjacent to and above the seal holder 94. The one or more ball bearings 106 provide radial stability to the neck 80 of the shaft 34. Further, one or more needle bearings 108 may be disposed within the top portion 38 of the stator 26 adjacent to and above the one or more balling bearings 106. The one or more needle bearings 108 provide axial stability to the shaft 34. Still further, a snap ring 110 may be configured to secure to a ridge 112 on the neck 80 of the shaft 34. Still yet further, an axial ridge 114 proximate to an end of the shaft 34 is configured to engage to the means for powering the mixer 16.

In operation, a polymer nanoparticle (NPC) mixture (or separately) are fed into the inlet 54 of the stator 26. The motor 14 provides a rotational force to the shaft 34 via the interface at the axial ridge 114. The shaft 34 rotates at a high frequency. In an exemplary embodiment, the shaft 34 rotates at a frequency of 17,800 Hertz. The NPC mixture encounters the screw groove region 90 of the shaft 34, which forces the NPC mixture towards the knurled region 86. In the knurled region 86, the agglomerations within NPC mixture experience extraordinary shearing forces that rupture the same. Due to forces from NPC mixture present in the screw groove region 90 above, the NPC mixture is further forced down into the smooth region 88. The NPC mixture undergoes extremely efficient erosion, whereby the NPC mixture becomes highly exfoliated. Thereafter, the NPC mixture is discharged from the outlet 74 of the stator 26 and to the orienter, which is discussed in detail below.

While in operation, fluid is pumped from a reservoir through couplers 64 and into the ports 58 of the top portion 36 of the stator 26. The fluid enters the cooling channels 56, wherein it encounters threading 66 and the cooling channel modifier 68. The fluid experiences heat transfer due to the increased surface area and turbulent now, thereby cooling the stator 26.

The present disclosure also contemplate that the mixer 16 can used as a continuous heterogenic catalyst reactor, if shaft outside surface and the stator inside surface are coated with catalyst. In such an embodiment, the catalyst will not be fouled due to self-cleaning by the high shear stress.

When the dispersed and exfoliated NPC mixture exits the outlet 74 of the stator 26, the mixture enters the orienter 120. Orientation does not require the high energy necessary for dispersion. In order to orient HARNPs within a polymer matrix requires fully developed steady laminar shear flow (FDSLSF). However, 10 get the FDSLSF is complicated due to surface roughness at the nanoscale. The orienter 120 of the present disclosure achieves FDSLSF by moving a moving plate 122 across a stationary plate 124 at a slight angle 121. In particular, the NPC mixture is disposed on a top surface 126 of the moving plate 122, after which the moving plate 122 travels at a slight angle 121 across the stationary plate 126 to orient the NPC based on the combination of shearing and extensional two-dimensional, drag-force-driven flow.

An exemplary embodiment of the orienter 120 is illustrated in FIGS. 1A, 1B, 2A and 2C. The orienter 120 is comprised of a track 128 mounted on the frame 12. The track 128 is configured to movably connect to five moving plates 122. The orienter 120 may further include a motor 130 connected to a drive gear 132. The drive gear 132 is configured to movably be coupled to teeth 134 on a lower surface 136 of the moving plate 122. Referring to FIGS. 10, 10A, 10B and 10C, a moving plate of an exemplary embodiment is illustrated. The moving plate 122 may be comprised of the upper surface 126 and the lower surface 136. One or more rows of the teeth 134 may be connected to the lower surface 136 of the moving plate 122. The moving plate 122 may be constructed of aluminum or any other metal commonly known in the art without deviating from the objects of the present disclosure.

Figure 11:
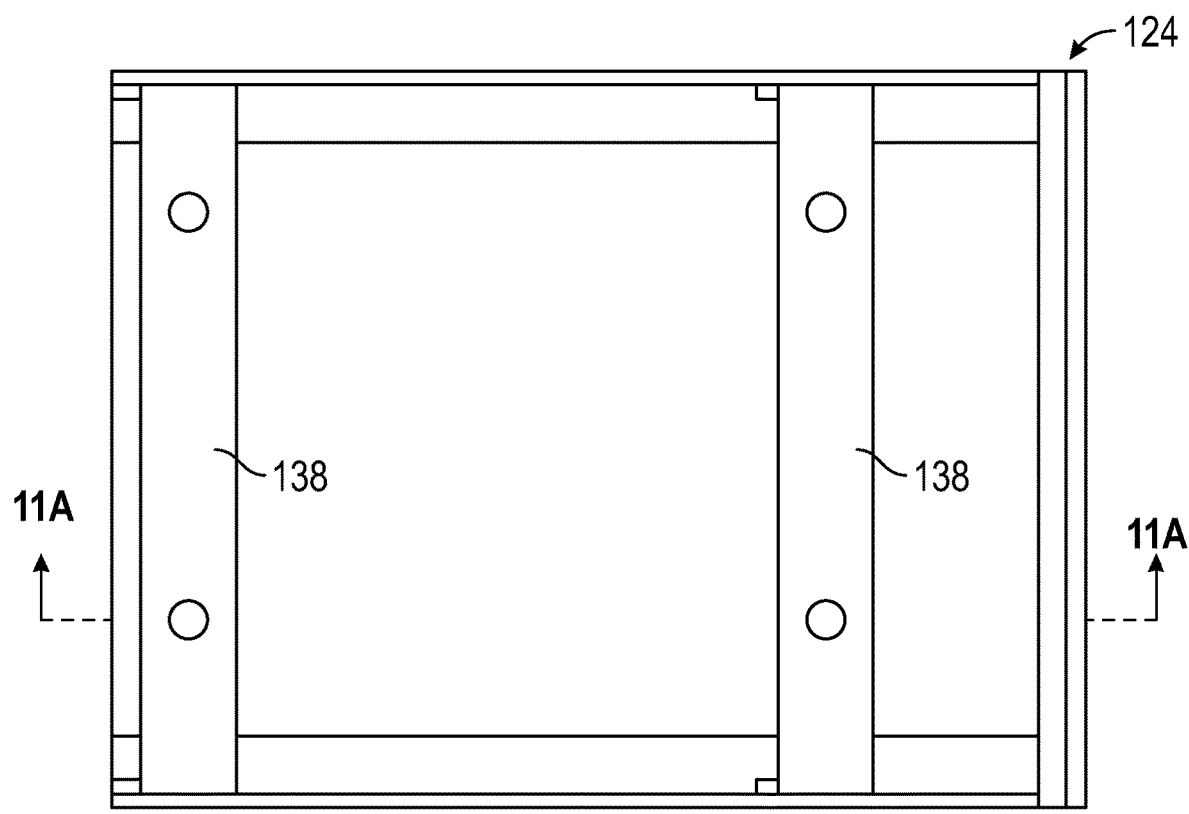
FIG. 11 is a top plan view of a stationary plate in accordance with an illustrative embodiment.
Figure 11A:
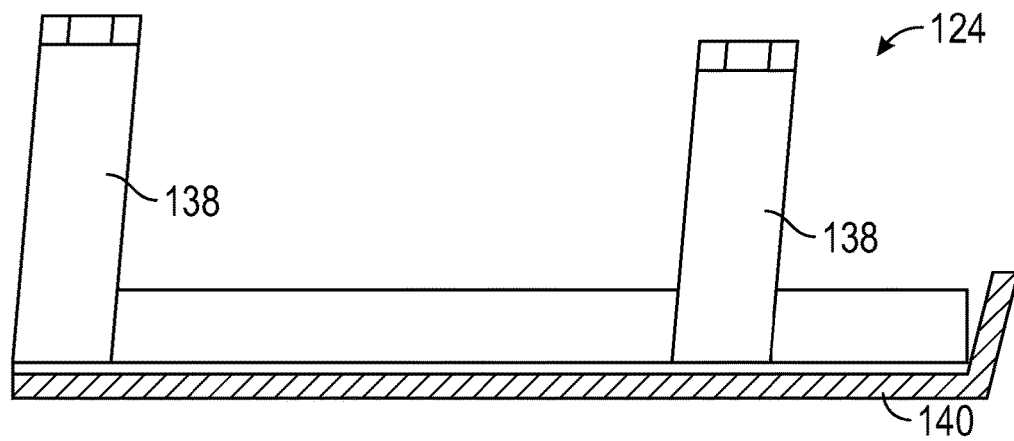
FIG. 11A is a cross-sectional view of the stationary plate of FIG. 11 taken along 10 section A-A.

The stationary plate 124 is mounted on the frame 12. As illustrated in FIGS. 11 and 11A, the stationary plate 124 one or more arms 138 that are rigidly connected to the frame 12. The stationary plate 124 further comprises a lower surface 140. The stationary plate 124 may be constructed of aluminum or any other metal commonly known in the art without deviating from the objects of the present disclosure.

The inlet side distance between the moving plate 122 and stationary plate 124 may be 0.24 mm while the outlet side distance may be 0.1 mm. Further, the moving plate 122 may decline at approximately a three-degree angle 121 relative to horizontal, or may be parallel.

The orienter 120 is in concurrent operation with the mixer 16 of the machine 10. In operation, the orienter 120 may receive a dispersed and exfoliated NPC mixture from mixer 16. The NPC mixture may descend onto the top surface 126 of the moving plate 122 through the force of gravity. The motor 130 drives the drive gear 132 that forces the moving plate 122 across the stationary plate 124, thereby exposing the NPC mixture to FDSLSF and/or to two-dimensional extending drag flow, thereby orienting the nanoparticles with the polymer mixture.

In the illustrated embodiment, the cycling process of the moving plates 122 is not automated; i.e., an individual must manually remove the moving plate 122 from an end of the track 128 and replace it at a beginning of the track 128. The present disclosure envisions a fully automated system.

Further, the moving plates lose heat during the continuous cycle. The moving plates need to cycle in closed area to prevent loose heat. The present disclosure envisions an enclosure that minimizes heat loss of the orienter 120.

The resulting NPC is dispersed, exfoliated, and oriented. The examples of improved physical properties (and other testing results) are discussed in Appendix A, which is incorporated herein by reference in its entirety.

The disclosure is not to be limited to the particular embodiments described herein. In particular, the disclosure contemplates numerous variations in the type of ways in which embodiments of the disclosure may be applied to disperse, exfoliate and orient high aspect nanoparticles with a polymer matrix. Further, the present disclosure contemplates that the mixer 16 and the orienter 120 of the HSTFM may be utilized separately as an independent mixer and orienter. The foregoing description has been presented for purposes of illustration and description. It is not intended to be an exhaustive list or limit any of the disclosure to the precise forms disclosed. It is contemplated that other alternatives or exemplary aspects that are considered included in the disclosure. The description is merely examples of embodiments, processes or methods of the disclosure. It is understood that any other modifications, substitutions, and/or additions may be made, which are within the intended spirit and scope of the disclosure. For the foregoing, it may be seen that the disclosure accomplishes at least all that is intended.

The previous detailed description is of a small number of embodiments for implementing the disclosure and is not intended to be limiting in scope. The following to claims set forth a number of the embodiments of the disclosure with greater particularity.

What is claimed is:

1. A method to disperse and orient nanoparticles within a matrix, the method comprising:
   providing a mixer having a stator and a shaft;
   providing an orienter having a stationary plate and a moving plate;
   feeding the nanoparticles and the matrix into the mixer;
   applying a rotational force to the shaft, wherein shearing forces disperse the nanoparticles within the matrix;
   exposing the nanoparticles and the matrix to an erosion region of the shaft having a substantially smooth surface;
   outputting a dispersed mixture onto the moving plate; and
   moving the moving plate, horizontally along a track, across the stationary plate, wherein the dispersed mixture is pressed between the moving plate and the stationary plate, and wherein the distance between the moving plate and the stationary plate decreases as the moving plate moves past the stationary plate; and
   orienting the dispersed mixture with a laminar shear flow or a two-dimensional extensional drag flow.

2. The method of claim 1, further comprising:
   exposing the nanoparticles and the matrix to a rupture region of the shaft having surface irregularities.

3. The method of claim 1, wherein the moving plate is coincident with a first horizontal plane and the stationary plate is angled relative to a second horizontal plane parallel and proximate to the first horizontal plane.

4. The method of claim 1, further comprising:
   pumping a fluid through one or more cooling channels within the stator of the mixer.

5. The method of claim 4, further comprising:
   inserting an elongated member within the one or more cooling channels to increase gas velocity passing through the one or more cooling channels.

6. The method of claim 4, further comprising:
   providing threading on a surface of the one or more cooling channels to increase surface area of the surface of the one or more cooling channels for dissipating heat.

7. The method of claim 1, further comprising:
   inserting a volume modifier into one or more cooling channels within the stator of the mixer to increase velocity and still maintain constant flow rates.

\* \* \* \* \*